US007944849B2

(12) United States Patent
Yamasaki

(10) Patent No.: US 7,944,849 B2
(45) Date of Patent: May 17, 2011

(54) TRANSMISSION PATH QUALITY MEASURING DEVICE, COMMUNICATION SYSTEM, QUALITY MEASUREMENT METHOD, AND QUALITY MEASURING PROGRAM

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 12/160,074

(22) PCT Filed: Jan. 9, 2007

(86) PCT No.: PCT/JP2007/050090
§ 371 (c)(1),
(2), (4) Date: Jul. 3, 2008

(87) PCT Pub. No.: WO2007/078008
PCT Pub. Date: Jul. 12, 2007

(65) Prior Publication Data
US 2009/0285110 A1 Nov. 19, 2009

(30) Foreign Application Priority Data
Jan. 6, 2006 (JP) .................. 2006-001868

(51) Int. Cl.
H04L 12/26 (2006.01)
(52) U.S. Cl. ...................... 370/252; 370/232
(58) Field of Classification Search .................. 370/249, 370/250, 251, 252, 253, 352, 356, 400, 401, 370/230, 230.1, 231, 232, 233, 234, 235, 370/236
See application file for complete search history.

(56) References Cited

U.S. PATENT DOCUMENTS

| 4,914,650 | A  | * | 4/1990 | Sriram | 370/235 |
| 5,367,523 | A  | * | 11/1994 | Chang et al. | 370/235 |
| 5,668,738 | A  | * | 9/1997 | Ataras, III | 370/235 |
| 6,826,157 | B1 | * | 11/2004 | Davis et al. | 370/252 |
| 7,145,935 | B2 | * | 12/2006 | Won et al. | 375/144 |
| 7,164,649 | B2 | * | 1/2007 | Walton et al. | 370/203 |
| 7,284,047 | B2 | * | 10/2007 | Barham et al. | 709/224 |
| 7,286,485 | B1 | * | 10/2007 | Ouellette et al. | 370/252 |

(Continued)

FOREIGN PATENT DOCUMENTS

JP 05-308330 11/1993

(Continued)

OTHER PUBLICATIONS

Yasuhiro Yamazaki et al., "TCP Packet Loss Ritsu Suitei Hoshiki no Hyoka—Kansoku Jikan to Keisoku Seido no Kankei-", 2005 Nen IEICE Communications Society Taikai, 05-Aki-Tsushin Society - B-14-2, Sep. 7, 2005, p. 389.

(Continued)

Primary Examiner — Chi H. Pham
Assistant Examiner — Kevin Mew
(74) Attorney, Agent, or Firm — Sughrue Mion, PLLC

(57) ABSTRACT

A communication quality measuring device includes: a quality measuring unit that measures the communication quality of a transmission path, based on data being transmitted through the transmission path; an observation time calculating unit that calculates a time interval for securing an observation time for the quality measuring unit; and a measurement triggering unit that causes the quality measuring unit to start measurement at the time interval calculated by the observation time calculating unit. The observation time is the time required for maintaining predetermined measurement accuracy in the communication quality measured by the quality measuring unit.

31 Claims, 15 Drawing Sheets

U.S. PATENT DOCUMENTS

| | | |
|---|---|---|
| 7,301,907 B2 * 11/2007 | Anbarani | 370/235 |
| 7,492,720 B2 * 2/2009 | Pruthi et al. | 370/252 |
| 7,525,923 B2 * 4/2009 | Matta | 370/252 |
| 7,574,726 B2 * 8/2009 | Zhang et al. | 725/95 |
| 2003/0086371 A1 * 5/2003 | Walton et al. | 370/235 |
| 2003/0095506 A1 * 5/2003 | Jalali et al. | 370/252 |
| 2004/0008627 A1 * 1/2004 | Garg et al. | 370/235 |
| 2005/0169190 A1 * 8/2005 | Mathieu et al. | 370/252 |
| 2007/0058651 A1 * 3/2007 | Bowen et al. | 370/412 |
| 2009/0310493 A1 * 12/2009 | Nogami | 370/252 |
| 2010/0085887 A1 * 4/2010 | Ray et al. | 370/252 |

FOREIGN PATENT DOCUMENTS

| | | |
|---|---|---|
| JP | 09-238139 | 9/1997 |
| JP | 2004-007339 A | 1/2004 |
| JP | 2004-172707 A | 6/2004 |
| JP | 2005-210515 A | 8/2005 |
| JP | 2005-348416 A | 12/2005 |

OTHER PUBLICATIONS

Kiminori Sugauchi et al., "Traffic Measurement Technique for High Traffic Networks", Technical Report of IEICE, NS2003-312, IN2003-267 (Mar. 2004).

Masato Tsuru et al., "An Experiment of Inferring Link Losses from End-to-End Measurement", Technical report of IEICE, NS2001-226 (Mar. 2002).

* cited by examiner

TRANSMISSION PATH QUALITY MEASURING DEVICE, COMMUNICATION SYSTEM, QUALITY MEASUREMENT METHOD, AND QUALITY MEASURING PROGRAM

TECHNICAL FIELD

The present invention relates to a quality measuring device that measures the communication quality of a transmission path such as a network, and to a communication system, a quality measurement method, and a quality measuring program for guaranteeing accuracy of the communication quality on the network.

BACKGROUND ART

In a case where a device performs communications with another device, there is often a problem with the quality of the network that connects those devices. In this specification, "the quality of a network" represents a throughput as an effective speed, the amount of packet loss in transmitted packets, a packet loss rate, a delay time caused in transmission, a jitter as a variation of the time required for a packet arrival, a RTT (Round Trip Time) as the time required for a packet traveling back and forth between a communication terminal and another communication terminal, or a packet delay distribution.

There have been suggestions for network quality measurement. The first one of the conventional suggestions involves a passive-type measuring operation in which packets flowing through a network are captured, and the traffic of the flowing packets is measured (see Non-Patent Document 1, for example).

The second one of the conventional suggestions involves an active-type measuring operation in which test packets are transmitted through a network, so as to measure the packet loss rate of the network (see Non-Patent Document 2, for example).

[Non-Patent Document 1] Kiminori Sugauchi, Hidemitsu Higuchi, Kazuaki Tsuchiya, and Jun Mizuno, "Traffic Monitoring Technique for High Traffic Networks", Technical Report of IEICE, NS2003-312, IN2003-267 (2004-03), March 2004 [Non-Patent Document 2] Masato Tsuru, Shuji Uetsuki, Yoshiaki Kitaguchi, Shinichi Nakagawa, Yuji Oie, "Experiments in Estimating Internal Packet Loss Rate Based on End-to-End Measurement", Technical Report of IEICE, NS2001-226 (2002-03), March 2002

DISCLOSURE OF THE INVENTION

Problems to be Solved by the Invention

In the passive-type sampling quality measurement and the active-type quality measurement suggested in the first and second suggestions, however, further improvements are expected in the reliability and accuracy of measurement carried out on transmission paths. Also, in the passive-type sampling quality measurement and the active-type quality measurement, there is a demand for quality measuring devices that can easily compare a result obtained at one time with a result obtained at another time, or one flow with another flow.

Therefore, an object of the present invention is to provide a quality measuring device that can have higher reliability and accuracy in the results of measurement carried out on a transmission path in a passive-type sampling quality measuring operation or an active-type quality measuring operation, and is to provide a communication system, a quality measurement method, and a quality measuring program.

Another object of the present invention is to provide a quality measuring device that can easily compare a result obtained at one time with a result obtained at another time or a flow with another flow in a passive-type sampling quality measuring operation or an active-type quality measuring operation, and is to provide a communication system, a quality measurement method, and a quality measuring program.

Means for Solving the Problems

A quality measuring device of the present invention includes:
a quality measuring unit that measures the communication quality of a transmission path, based on data being transmitted through the transmission path;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is the time required for maintaining predetermined measurement accuracy in the communication quality measured by the quality measuring unit.

A communication system of the present invention includes:
a transmission path through which data are transmitted;
a branching device that causes the data flowing through the transmission path to branch in midstream; and
a quality measuring device that is connected to the branching device, with the quality measuring device including:
a quality measuring unit that measures the communication quality of the transmission path, based on the branching data;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is a time required for maintaining predetermined measurement accuracy in the communication quality measured by the quality measuring unit.

Another communication system of the present invention includes:
a transmission path through which data are transmitted;
first and second communication terminals that are connected by the transmission path;
a transmission rate setting unit that is connected to the first communication terminal, and sets a transmission rate for the data being transmitted from the first communication terminal; and
a quality measuring device that is connected to the second communication terminal,
with the quality measuring device including:
a quality measuring unit that measures the communication quality of the transmission path, based on data received by the second communication terminal;
an observation time calculating unit that calculates a time interval for securing an observation time for the quality measuring unit; and
a measurement start control unit that causes the quality measuring unit to start measurement at the time interval calculated by the observation time calculating unit, wherein the observation time is the time required for maintaining predetermined measurement accuracy in the communication quality measured by the quality measuring unit.

A communication system of the present invention includes:

a transmission path through which data are transmitted;

first and second communication terminals that are connected by the transmission path;

a transmission rate setting unit that is connected to the first communication terminal, and sets a transmission rate for the data being transmitted through the transmission path;

a quality measuring device that is connected to the transmission rate setting unit; and a data storing unit that is connected to the second communication terminal, with the quality measuring device including:

a quality measuring unit that measures the communication quality of the transmission path, based on data transmitted from the data storing unit and received by the first communication terminal;

an observation time calculating unit that calculates a time interval for securing an observation time for the quality measuring unit; and a measurement start control unit that causes the quality measuring unit to start measurement at the time interval calculated by the observation time calculating unit, wherein the observation time is the time required for maintaining predetermined measurement accuracy in the communication quality measured by the quality measuring unit, the observation time calculating unit calculates the time interval for securing the observation time for the quality measuring unit and a transmission rate so as to maintain the measurement accuracy, and transmits information about the transmission rate to the transmission rate setting unit, and the transmission rate setting unit sets the transmission rate for the data being transmitted through the transmission path, based on the information about the transmission rate.

A test packet designating device of the present invention includes:

a transmission rate setting unit that sets a transmission rate for a test packet to be transmitted through a transmission path;

a quality measuring unit that measures communication quality of the transmission path, based on the test packet being transmitted through the transmission path;

an observation time calculating unit that calculates a time interval for securing an observation time for the quality measuring unit; and a measurement start control unit that causes the quality measuring unit to start measurement at the time interval calculated by the observation time calculating unit, wherein observation time is a time required for maintaining predetermined measurement accuracy in the communication quality measured by the quality measuring unit, the observation time calculating unit calculates the time interval for securing the observation time for the quality measuring unit and a transmission rate of the test packet so as to maintain the measurement accuracy, and transmits information about the transmission rate to the transmission rate setting unit, and the transmission rate setting unit sets the transmission rate for the test packet being transmitted through the transmission path, based on the information about the transmission rate.

A quality measurement method of the present invention is to be utilized by a quality measuring device that includes a quality measuring unit that measures the communication quality of a transmission path, based on data being transmitted through the transmission path, the quality measurement method including:

calculating a time interval for securing an observation time required for maintaining predetermined measurement accuracy in the communication quality measured by the quality measuring unit; and causing the quality measuring unit to start measurement at the calculated time interval.

Another quality measurement method of the present invention is to be utilized in a communication system that includes a transmission path through which data are transmitted, a branching device that causes the data flowing through the transmission path to branch in midstream, and a quality measuring unit that measures the communication quality of a transmission path, based on the branching data transmitted from the branching device, the quality measurement method including:

calculating a time interval for securing an observation time required for maintaining predetermined measurement accuracy in the communication quality measured by the quality measuring unit; and causing the quality measuring unit to start measurement at the calculated time interval.

A quality measurement method of the present invention is to be utilized in a communication system that includes: a transmission path through which data are transmitted; first and second communication terminals that are connected by the transmission path; a transmission rate setting unit that is connected to the first communication terminal and sets a transmission rate for the data being transmitted through the transmission path; and a quality measuring device that is connected to the second communication terminal and includes a quality measuring unit that measures the communication quality of the transmission path, based on data received by the second communication terminal, the quality measurement method including:

calculating a time interval for securing an observation time required for maintaining predetermined measurement accuracy in the communication quality measured by the quality measuring unit; and causing the quality measuring unit to start measurement at the calculated time interval, the calculating the time interval and the causing the quality measuring unit to start measurement being carried out in the quality measuring device.

A quality measurement method of the present invention is to be utilized in a communication system includes: a transmission path through which data are transmitted; first and second communication terminals that are connected by the transmission path; a transmission rate setting unit that is connected to the first communication terminal and sets a transmission rate for the data being transmitted through the transmission path; a data storing unit that is connected to the second communication terminal; and a quality measuring device that is connected to the transmission rate setting unit and includes a quality measuring unit that measures the communication quality of the transmission path, based on data transmitted from the data storing unit and received by the first communication terminal, the quality measurement method including:

calculating a time interval for securing an observation time required for maintaining predetermined measurement accuracy in the communication quality measured by the quality measuring unit;

causing the quality measuring unit to start measurement at the calculated time interval, calculating the time interval for securing the observation time and a transmission rate so as to maintain the measurement accuracy;

transmitting information about the transmission rate to the transmission rate setting unit; and causing the transmission rate setting unit to set a transmission rate for the data being transmitted through the transmission path, based on the information about the transmission rate.

A quality measurement method of the present invention is to be utilized in a test packet designating device that includes: a transmission rate setting unit that sets a transmission rate for a test packet being transmitted through a transmission path; and a quality measuring unit that measures the communication quality of the transmission path, based on the test packet being transmitted through the transmission path, the quality measurement method including:

calculating a time interval for securing an observation time required for maintaining predetermined measurement accuracy in the communication quality measured by the quality measuring unit;

causing the quality measuring unit to start measurement at the calculated time interval, calculating the time interval for securing the observation time so as to maintain the measurement accuracy;

transmitting information about the transmission rate to the transmission rate setting unit; and causing the transmission rate setting unit to set a transmission rate for the data being transmitted through the transmission path, based on the information about the transmission rate.

A quality measuring program of the present invention is executed by a computer serving as a quality measuring device that measures the communication quality of data being transmitted through a transmission path, the quality measuring program causing the computer to perform:

a quality measuring function of measuring communication quality of the transmission path, based on the data being transmitted through the transmission path;

an observation time calculating function of calculating a time interval for securing an observation time required for maintaining predetermined measurement accuracy in the communication quality measured by the quality measuring function; and a measurement start control function of causing the quality measuring function to start measurement at the calculated time interval.

Another quality measuring program of the present invention is executed by a computer serving as a test packet designating device that sets a transmission rate for a test packet to be transmitted through a transmission path, the quality measuring program causing the computer to perform:

a transmission rate setting function of setting the transmission rate for the test packet being transmitted through the transmission path;

a quality measuring function of measuring the communication quality of the transmission path, based on the test packet being transmitted through the transmission path;

an observation time calculating function of calculating a time interval for securing an observation time required for maintaining predetermined measurement accuracy in the communication quality measured by the quality measuring function; and a measurement start control function of causing the quality measuring function to start measurement at the time interval calculated by the observation time calculating function, wherein the observation time calculating function calculates a time interval for securing the observation time for the quality measuring function and a transmission rate of the test packet so as to maintain the measurement accuracy, and transmits information about the transmission rate to the transmission rate setting function, and the transmission rate setting function sets a transmission rate for the test packet being transmitted through the transmission path, based on the information about the transmission rate.

Effects of the Invention

In accordance with the present invention, an observation time is determined by an observation time calculating unit, so as to maintain predetermined measurement accuracy in the communication quality measured by a quality measuring unit. Accordingly, certain accuracy can be guaranteed in the obtained quality measurement results, and higher reliability and accuracy can be achieved in the results of measurement carried out on a transmission path.

Also, it becomes easier to compare a result obtained at one time with a result obtained at another time, or compare a flow with another flow.

Figure 1:
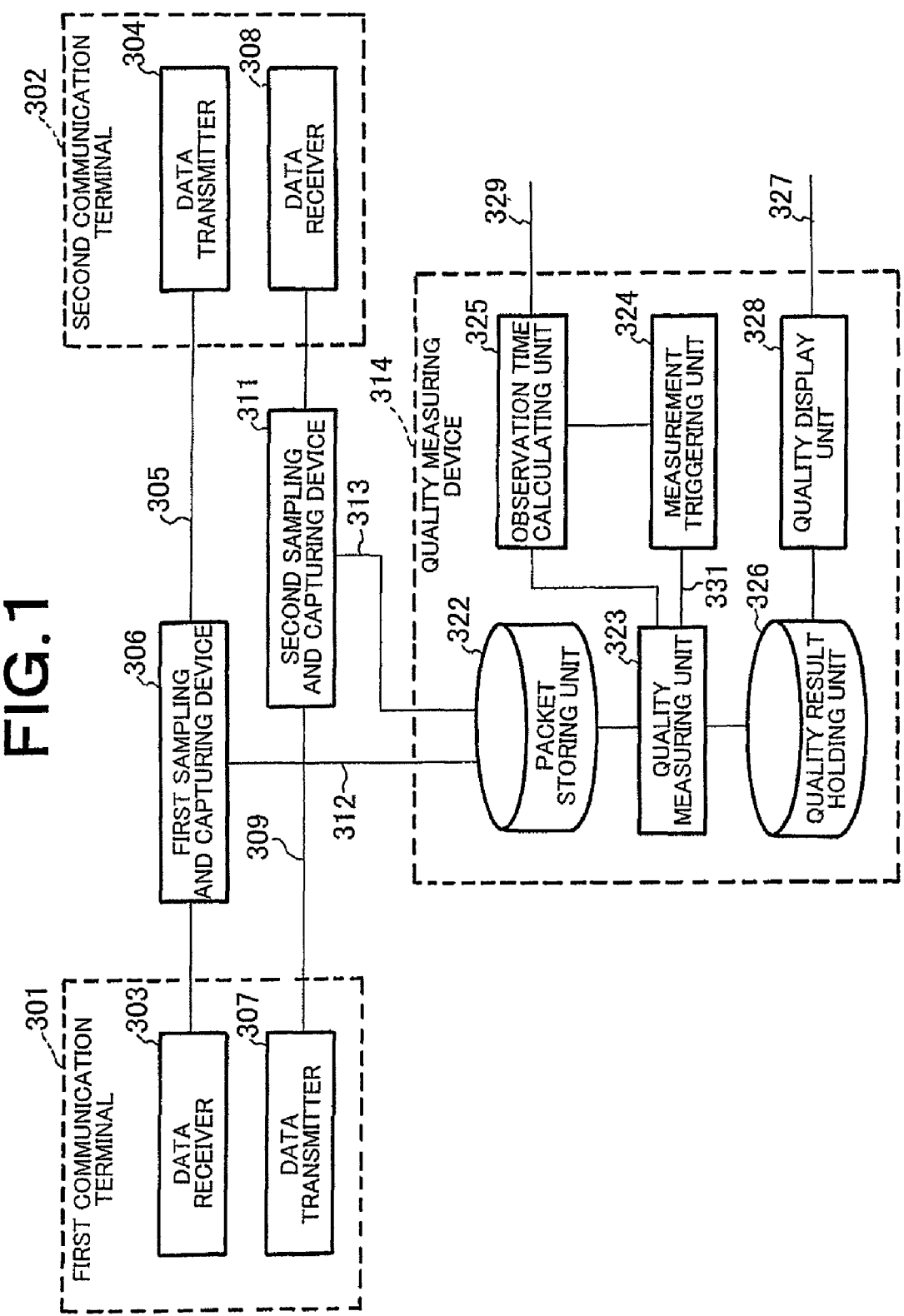
FIG. 1 illustrates the structure of a communication system that is capable of carrying out network quality measurement in accordance with a first embodiment of the present invention.

DESCRIPTION OF REFERENCE SYMBOLS 301, 501, 701 First communication terminal
302, 502, 702 Second communication terminal
303, 308, 504, 704, 707 Data receiver
304, 307, 503, 703, 706 Data transmitter
306 First sampling and capturing device
311 Second sampling and capturing device
314, 512, 712 Quality measuring device
322, 522, 732 Packet storing unit
323, 524, 734 Quality measuring unit
324, 526, 736 Measurement triggering unit
325, 528, 738 Observation time calculating unit
511, 711 Test packet designating device
513, 721 Transmission rate setting unit

PREFERRED EMBODIMENTS FOR CARRYING OUT THE INVENTION

First, two communication systems are described as related arts of the present invention, before a description of embodiments of the present invention is made. The later described embodiments of the present invention have changes and modifications made to the following communication systems.

[Communications Systems as Related Arts of the Present Invention]

Figure 10:
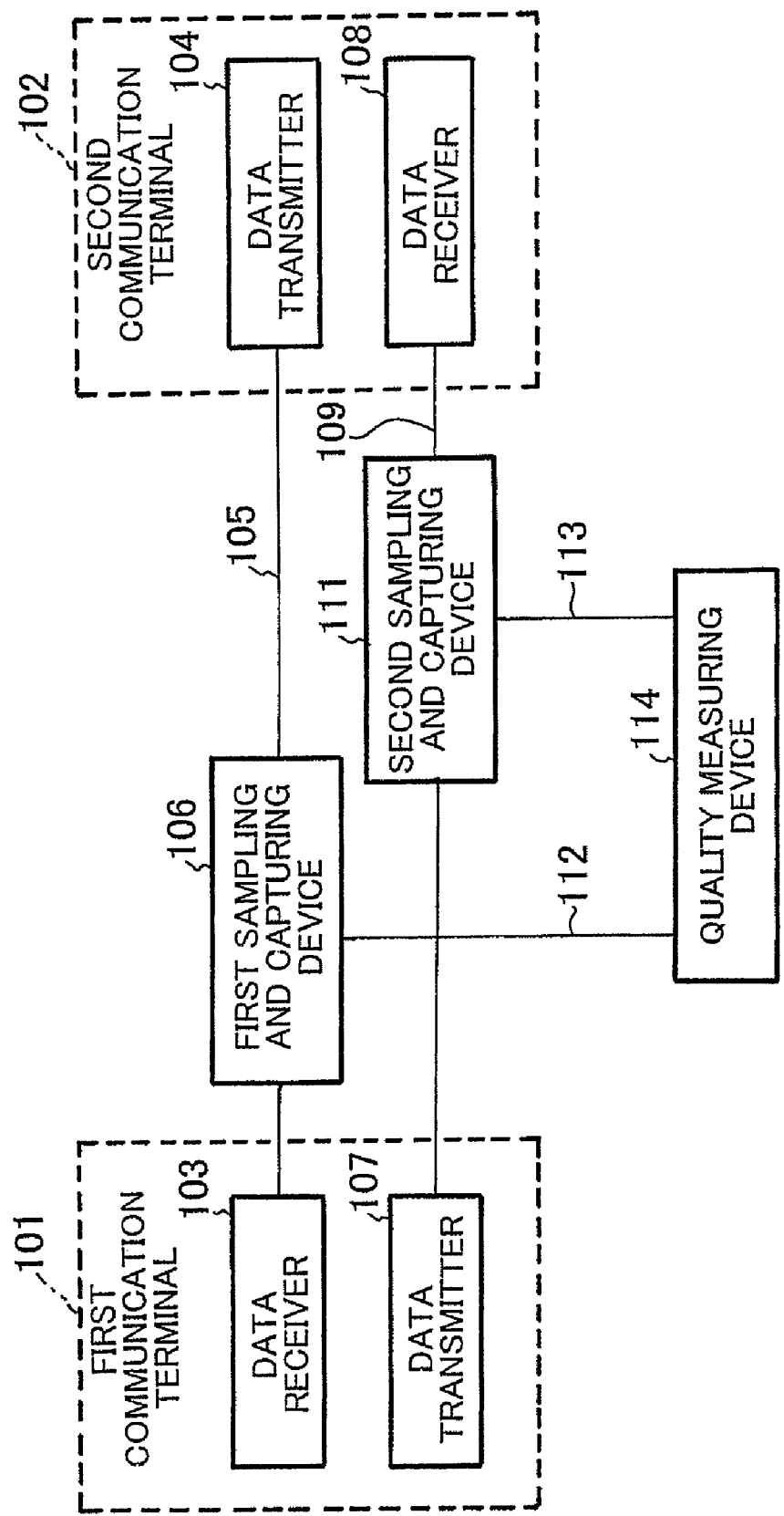
FIG. 10 illustrates the structure of a communication system in which network quality measurement is carried out through passive-type sampling measurement in accordance with a first conventional suggestion.
Figure 11:
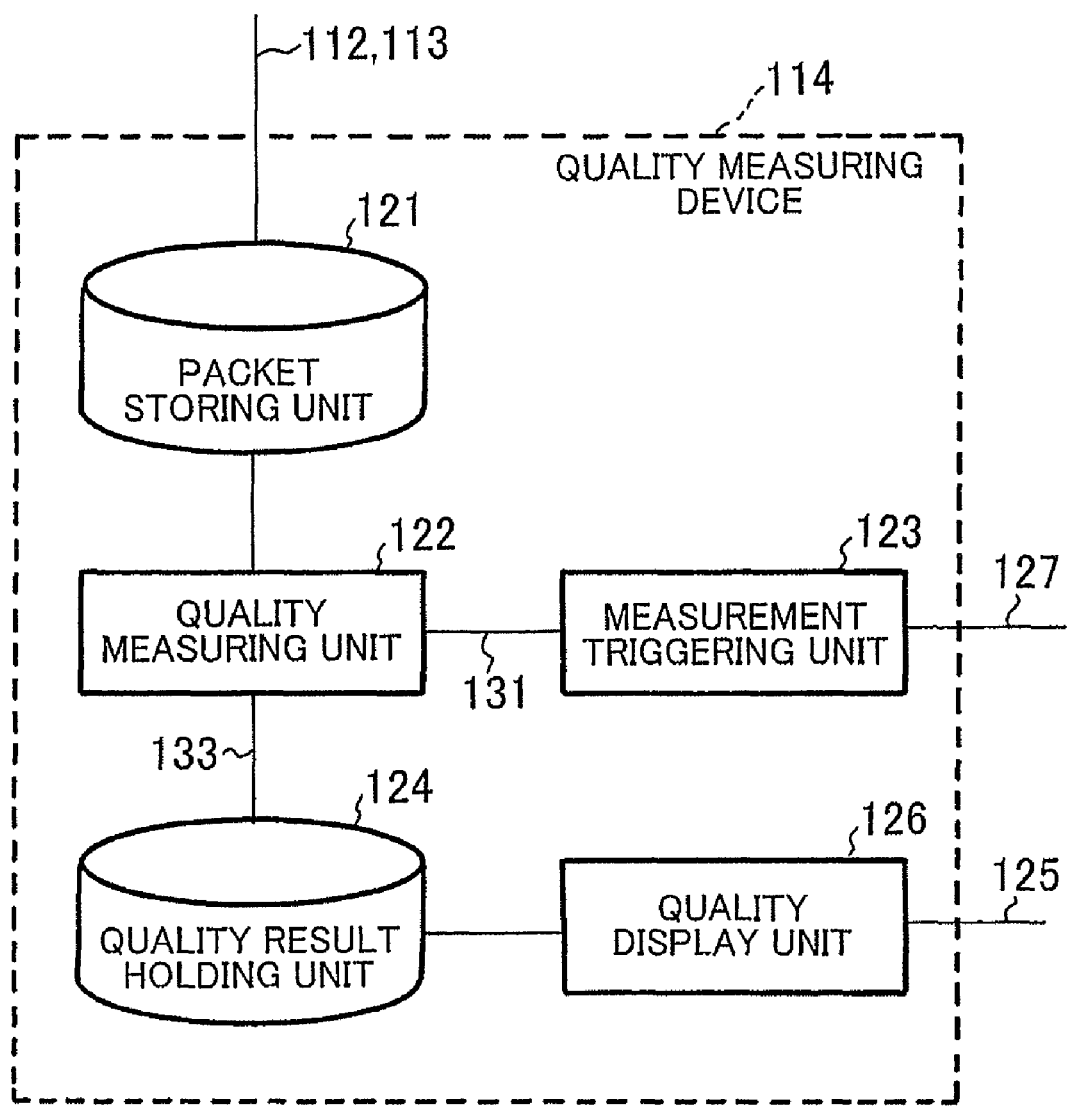
FIG. 11 is a block diagram schematically showing the structure of the quality measuring device in accordance with the first conventional suggestion.
Figure 12:
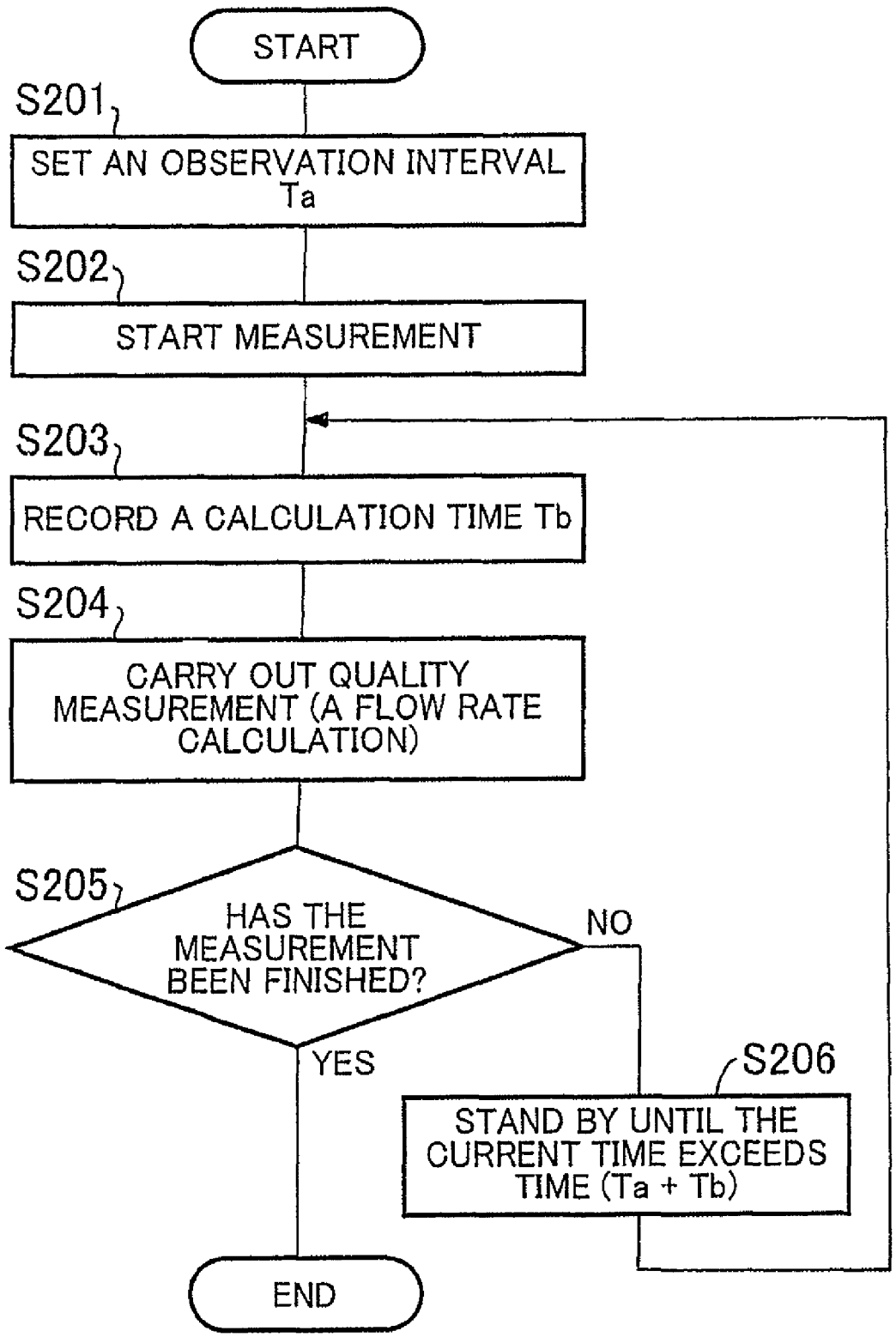
FIG. 12 is a flowchart showing a measuring processing to be performed by the quality measuring device in accordance with the first conventional suggestion.

FIGS. 10 to 12 illustrate a first communication system as a related art of the present invention. FIG. 10 shows the structure of the first communication system for which network quality measurement is carried out. In this communication system, the quality of packet communications between a first communication terminal 101 and a second communication terminal 102 is measured. A first sampling and capturing device 106 is placed as a branching device on a communication link 105 connecting a data receiver 103 of the first communication terminal 101 and a data transmitting unit 104 of the second communication terminal 102. Also, a second sampling and capturing device 111 is placed as another branching device on a communication link 109 connecting a data transmitting unit 107 of the first communication terminal 101 and a data receiver 108 of the second communication terminal 102. Packets 112 and 113 that are obtained from the first and second sampling and capturing devices 106 and 111 and are subjected to measurement are input to the quality measuring device 114, which measures the quality of packet communications.

FIG. 11 is a schematic view of the structure of the quality measuring device 114 in the first communication system. The quality measuring device 114 includes a packet storing unit 121 that stores the packets 112 and 113 sampled and captured through the first and second sampling and capturing devices 106 and 111, a quality measuring unit 122 that analyzes the data stored in the packet storing unit 121 and measures the quality of the stored data, a measurement triggering unit 123 that notifies the quality measuring unit 122 of the timing of quality analysis, a quality result holding unit 124 that stores the results of the quality measurement carried out by the quality measuring unit 122, and a quality display unit 126 that outputs the quality measurement results held by the quality result holding unit 124 as a result display signal 125 to a display (not shown) or the like.

Here, the quality measuring unit 122 is designed to measure the quality of the network or measure the quality of a flow determined by a combination of the same transmission terminal or reception terminal and a protocol and the like. The measurement triggering unit 123 is designed to receive observation interval setting information 127 that is input from a system outside the quality measuring device 114.

In this first communication system, packets flowing through the network connecting the first and second communication terminals 101 and 102 shown in FIG. 10 are captured by the quality measuring device 114, so as to start an operation. The packets as the data that are input through the first and second sampling and capturing devices 106 and 111 are received by the packet storing unit 121, and are stored together with data acquisition times.

The measurement triggering unit 123 refers to the observation interval time determined by the observation interval setting information 127 that is set by a user prior to the start of the measuring operation. Every time the observation interval time passes, the measurement triggering unit 123 notifies the quality measuring unit 122 of a start of quality measurement. Every time receiving a quality measurement starting command 131 from the measurement triggering unit 123, the quality measuring unit 122 starts a quality calculation. A quality calculation is performed by measuring quality based on the data obtained from the packet storing unit 121 after the previous measurement, or by measuring quality based on the data received after the start of the quality measuring operation if it is immediately after the start of the operation.

The quality measurement carried out in this first communication system is designed to measure data amounts, and the quality measuring unit 122 performs calculations according to the following equation (1). In the equation (1), "n" represents the number of sets of sampled and captured data, and "s" represents the sampling probability:

$$\text{(Estimated amount of communication data)} = n/s \qquad (1)$$

In the equation (1), the number "n" of data sets represents the estimated amount of captured data communication in the entire line, in a case where all the received data are the subject data. In a case where only the data of a certain flow among the reception data are the subject data, the number "n" of data sets represents the estimated amount of communication data of the flow passing through the line. When a quality measuring procedure carried out by the quality measuring unit 122 comes to an end in the first communication system, the data 133 indicating the calculation results is recorded in the quality result holding unit 124. After the calculations are ended, the quality measuring unit 122 suspends the operation until the next quality measurement starting command 131 is issued from the measurement triggering unit 123.

The quality display unit 126 outputs the quality measurement results stored in the quality result holding unit 124 to a display or the like in the timing designated by the system. The timing designated by the system may be represented by a fixed time interval that is set in advance by the device, or may be represented by the time of an event when the amount of communication is equal to or exceeds a certain value, or is equal to or becomes smaller than a certain value.

FIG. 12 is a flowchart showing a measuring operation to be performed by this quality measuring device 114. The quality measuring device 114 has a CPU (Central Processing Unit; not shown in the drawings) executing a control program stored in a recording medium (not shown), so as to carry out a series of measuring procedures. The following explanation is made in conjunction with FIG. 11. First, the quality measuring device 114 sets an observation interval Ta at which the quality measurement starting command 131 is output (step S201). After that, a measuring procedure starts (step S202). The packets 112 and 113 as the data captured by the first and second sampling and capturing devices 106 and 111 are stored in the packet storing unit 121 in the quality measuring device 114.

In step S203, the calculation time Tb at which the quality measurement starting command 131 is transmitted from the measurement triggering unit 123 to the quality measuring unit 122 is recorded. After the calculation time Tb is recorded, a quality measuring procedure starts (step S204). In this quality measuring procedure, quality measurement is carried out based on the data obtained after the previous measurement, or based on the data received after the start of the quality measurement if it is immediately after the start of the operation. The quality measurement in this first communication system is carried out based on the data amount, and a calculation according to the equation (1) is performed.

In a case where all the received data are the subject data, the number "n" of data sets in the calculation according to the equation (1) represents the estimated amount of communication data captured through the entire line. In a case where only a certain flow in the received data is the subject data, the number n of data sets represents the estimated amount of communication data of the flow passing through the line.

When the quality calculation of step S204 is ended, the data 133 that are the calculation results are recorded on the quality result holding unit 124. After the calculation is finished, the quality measuring unit 122 suspends the operation until the next quality measurement starting command 131 is issued from the measurement triggering unit 123, and moves on to step S205.

In step S205, whether the measuring operation has been finished is determined. More specifically, if there is a measurement stopping command issued from the system, the quality measuring procedure is stopped (YES), and the measurement is ended (END). If there is not a measurement stopping command issued from the system ("NO" in step S205), the operation moves on to step S206.

In step S206, a part of the operation to be performed by the measurement triggering unit 123 is carried out. The value obtained by adding the observation interval Ta and the calculation time Tb at which the last quality measurement is started is set as the next quality measurement starting time. Accordingly, in step S206, the operation is suspended until the current time exceeds the value obtained by adding the calculation time Tb and the observation interval Ta. When the time comes, the quality measurement starting command 131 is transmitted to the quality measuring unit 122. After this procedure, the procedure of step S203 is carried out.

Figure 13:
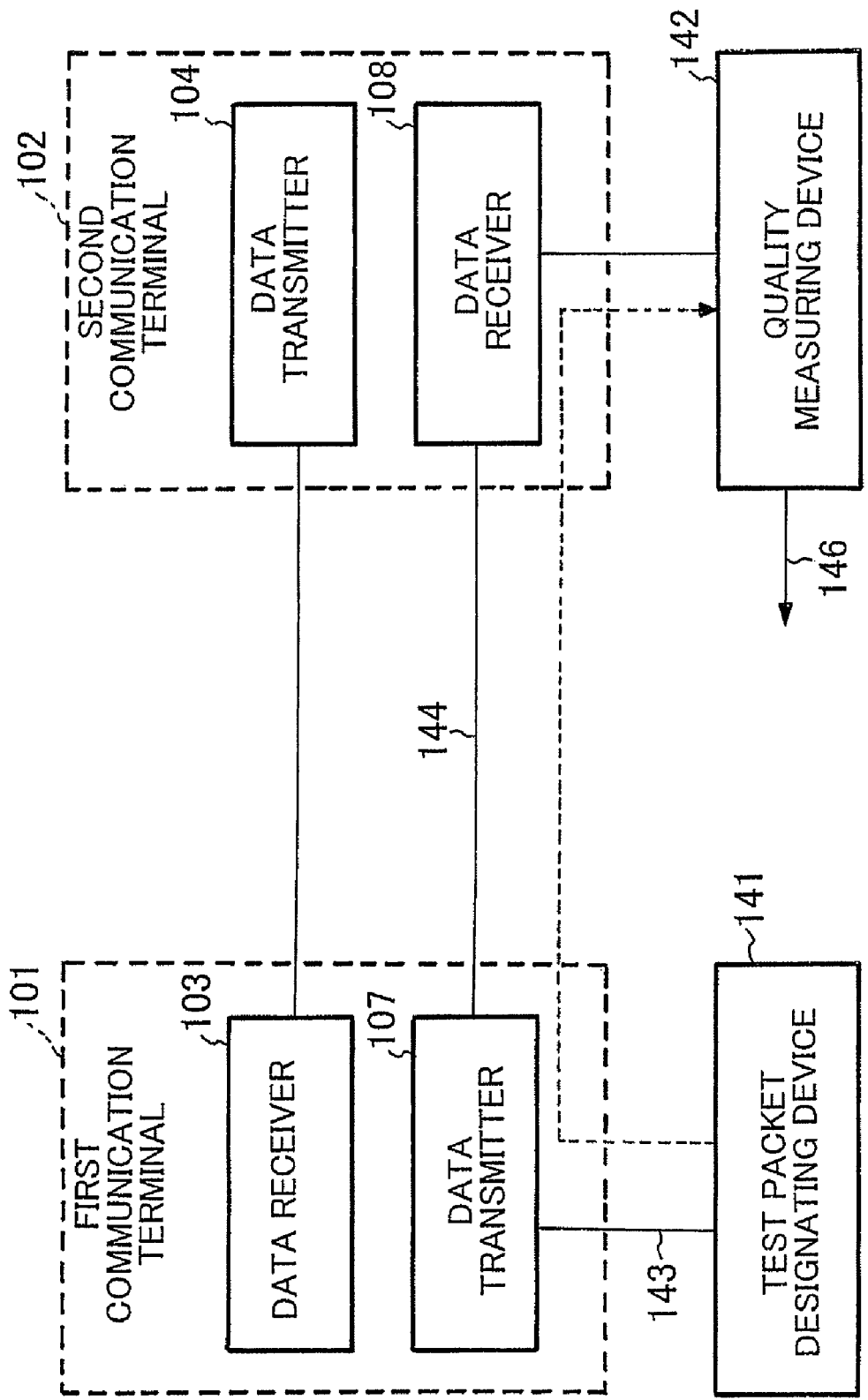
FIG. 13 illustrates the structure of a communication system in which network quality measurement is carried out through active-type quality measurement in accordance with a second conventional suggestion.
Figure 14:
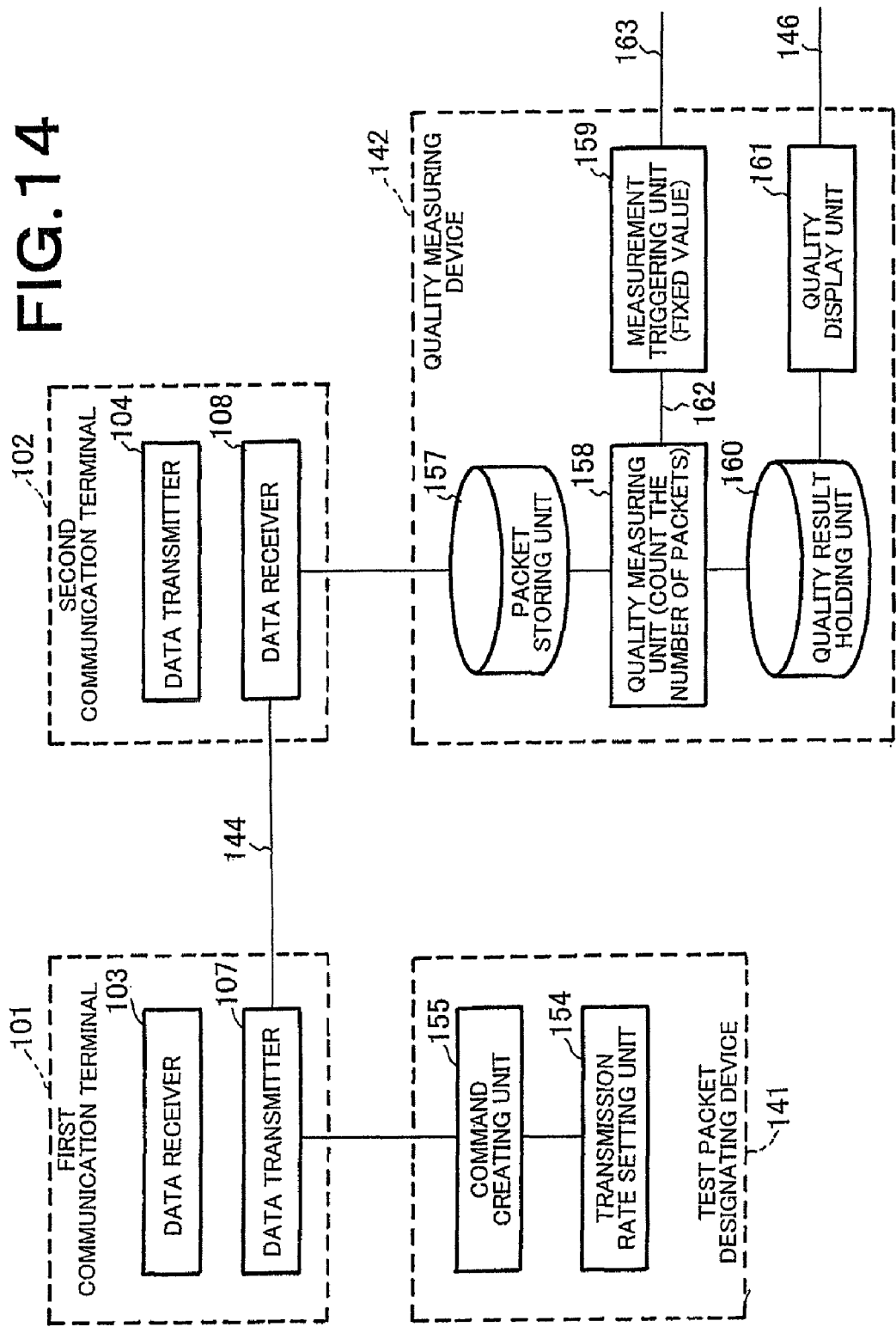
FIG. 14 is a block diagram illustrating the structures of the test packet designating device and the quality measuring device in accordance with the second conventional suggestion.
Figure 15:
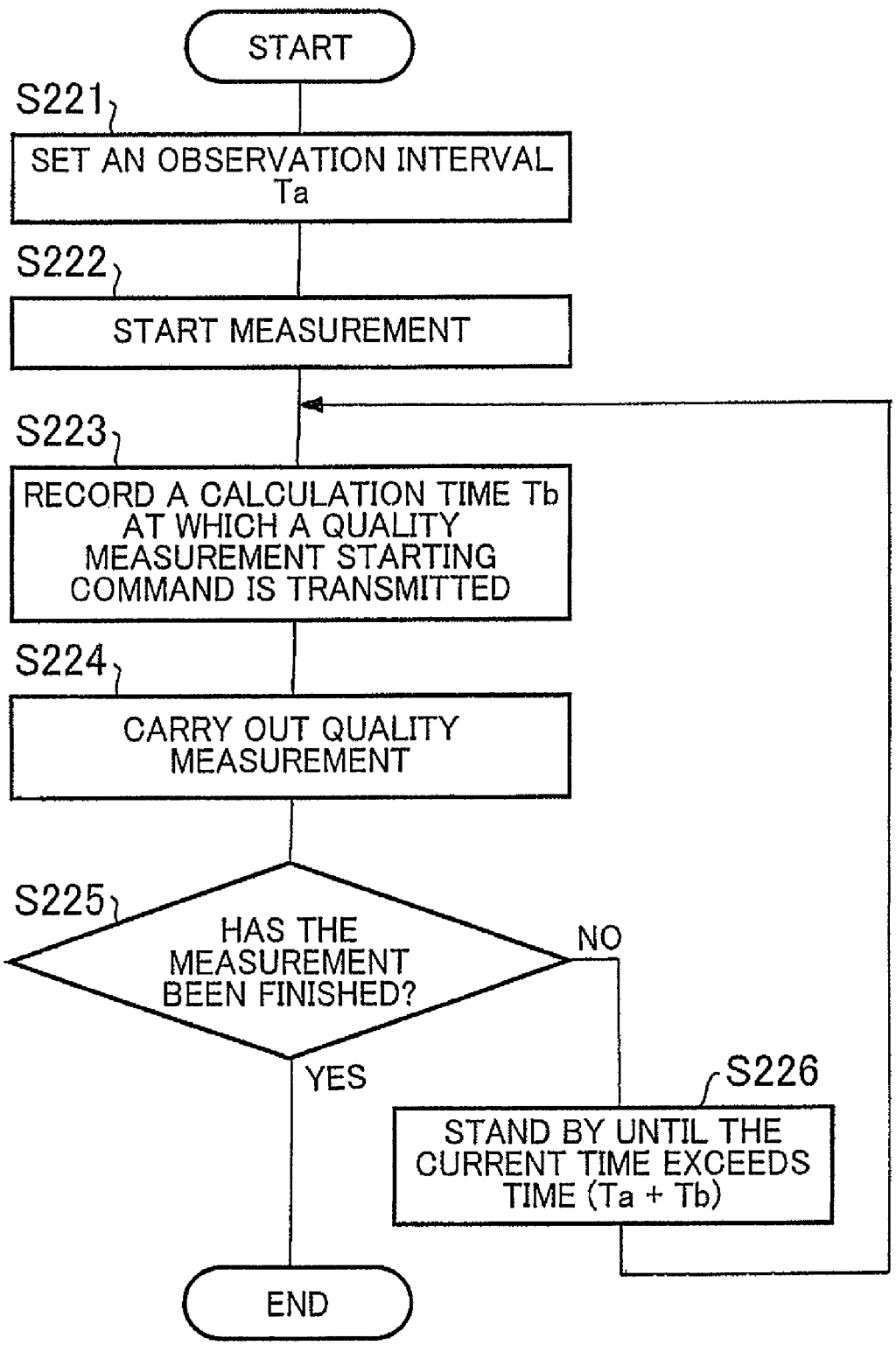
FIG. 15 is a flowchart showing a network quality measurement processing in the communication system in accordance with the second conventional suggestion.

FIGS. 13 to 15 illustrate a second communication system. FIG. 13 illustrates the structure of the second communication system in which network quality measurement is carried out. In FIG. 13, the same components as those shown in FIG. 10 are denoted by the same reference numerals as those in FIG. 10, and explanation of them is omitted here. In the system illustrated in FIG. 13, the quality of packet communications is measured between the first communication terminal 101 and the second communication terminal 102.

In the second communication system, a test packet designating device 141 is connected to the first communication terminal 101, and a quality measuring device 142 is connected to the second communication terminal 102. The test packet designating device 141 is designed to send a test packet sending command 143. In accordance with the test packet sending command 143, the data transmitting unit 107 of the first communication terminal 101 transmits a test packet 144. Upon receipt of the test packet 144, the second communication terminal 102 causes the quality measuring device 142 to estimate the quality of the network from the first communication terminal 101 to the second communication terminal 102, based on the packet received as a data string. The results of the quality estimation are transmitted as result information 146 to the test packet designating device 141, and are displayed on a display (not shown).

FIG. 14 illustrates the test packet designating device 141 and the quality measuring device 142 in the second communication system in greater detail. The test packet designating device 141 includes a transmission rate setting unit 154 that determines the packet transmission rate, and a command creating unit 155 that transmits a command output from the transmission rate setting unit 154 to the first communication terminal 101. The data transmitting units 107 and 104 can transmit packets other than the packets designated by the test packet designating device 141. The data receivers 103 and 108 can receive packets other than test packets.

The quality measuring device 142 includes: a packet storing unit 157 that stores the packets received by the data receiver 108; a quality measuring unit 158 that counts the number of packets based on the data stored in the packet storing unit 157, so as to measure the quality; a measurement triggering unit 159 that sends a measurement starting command to the quality measuring unit 158; a quality result holding unit 160 that records and holds the results calculated by the quality measuring unit 158; and a quality display unit 161 that output the results held by the quality result holding unit 160 as the result information 146 to another device such as a display (not shown). Observation interval setting information 163 is input to the measurement triggering unit 159.

In the second communication system, the test packet designating device 141 is designed to determine the transmission rate at which test packets (data) flow through the network, and to notify the command creating unit 155 of the transmission rate. The command creating unit 155 instructs the data transmitting unit 107 of the first communication terminal 101 to transmit the test packets 144 at the transmission rate designated by the transmission rate setting unit 154. The data transmitting unit 107 then transmits the test packets 144 at the designated transmission rate.

The data receiver 108 of the second communication terminal 102 receives the test packets 144 transmitted from the data transmitting unit 107 of the first communication terminal 101. The results of the reception are stored in the packet storing unit 157 of the quality measuring device 142.

The measurement triggering unit 159 refers to the observation interval setting information 163 that is set by the user prior to the start of measurement, and notifies the quality measuring unit 158 of a quality measurement start through a quality measurement starting command 162 every time the observation interval time passes. The quality measuring unit 158 starts a quality calculation every time the quality measurement starting command 162 is transmitted from the measurement triggering unit 159. The quality measuring unit 158 carries out quality measurement, based on the data that is obtained from the packet storing unit 157 after the previous measurement. Immediately after the start of an operation, the quality measuring unit 158 carries out quality measurement, based on the data that is received after the start of the quality measurement.

The quality measurement carried out in the second communication system is designed to measure packet loss, and calculations according to the following equation (2) are performed. In the equation (2), "n1" represents the number of test packets that are transmitted within the network by the data transmitting unit 107 in accordance with an instruction from the test packet designating device 141, and "n2" represents the number of test packets that are received by the data receiver 108 and are stored in the packet storing unit 157:

$$(\text{Packet loss amount}) = n1 - n2 \qquad (2)$$

In a case where all the received data are the subject data, the numbers "n1" and "n2" of test packets used in the equation (2) represent the estimated amounts of communication data captured in the entire line. In a case where only the data of a certain flow among the received data are the subject data, the numbers "n1" and "n2" of test packets each represent the estimated amount of communication data of the flow passing through the line. In terms of time, the quality since the start of the test is measured in a case where the total number of test packets transmitted after the start of the test is counted. In a case where the number of test packets transmitted after the end of the previous measurement is counted, the packet loss caused between the end of the previous measurement and the current measurement is measured. Also, a packet loss rate can be calculated by dividing the value "n1−n2" obtained according to the equation (2) by the value n1.

When the quality measuring procedure carried out by the quality measuring unit 158 comes to an end, the calculation results are recorded in the quality result holding unit 160. After the calculations by the quality measuring unit 158 are ended, the quality measuring unit 158 suspends the operation until the next quality measurement starting command is issued from the measurement triggering unit 159.

The quality display unit 161 outputs the quality measurement results stored in the quality result holding unit 160 to a display or the like in the timing designated by the system. The timing designated by the system may be represented by a fixed time interval that is set in advance by the device, or may be represented by the time of an event when the amount of communication is equal to or exceeds a certain value, or is equal to or becomes smaller than a certain value.

FIG. 15 is a flowchart showing a network quality measuring operation to be performed in the second communication system. In this communication system, prior to a start of a measuring operation, an observation interval Ta at which quality measurement is to be carried out is set in the measurement triggering unit 159 of the quality measuring device 142 (step S221). After the procedure of step S221, a measuring procedure starts (step S222). In this procedure, a transmission rate is determined by the transmission rate setting unit 154 in the test packet designating device 141, and the command creating unit 155 sends the transmission rate to the data transmitting unit 107 in the first communication terminal 101. Transmission of the test packets 144 is then started at the designated rate. As the measurement starting procedure is carried out, the test packets 144 reach the second communication terminal 102, and the packets received by the data receiver 108 are stored in the packet storing unit 157 of the quality measuring device 142.

In step S223, the calculation time Tb at which the quality measurement starting command 162 is transmitted from the measurement triggering unit 159 to the quality measuring unit 158 is recorded, which is a part of the operation to be performed by the measurement triggering unit 159. After the calculation time Tb is recorded, a quality measuring procedure starts, and the operation moves on to step S224.

In step S224, the quality measuring procedure is carried out by the quality measuring unit 158. In this procedure, quality measurement is carried out based on the data obtained from the packet storing unit 157 after the previous measurement, or based on the data received after the start of the quality measurement if it is immediately after the start of the operation. The quality measurement in this second communication system is carried out based on the packet loss amount, and a calculation according to the equation (2) is performed.

In a case where all the received data are the subject data, the numbers "n1" and "n2" of test packets used in this calculation each represent the estimated amount of communication data captured in the entire line. In a case where only the data of a certain flow among the received data are the subject data, the numbers "n1" and "n2" of test packets each represent the estimated amount of communication data of the flow passing through the line. In terms of time, the quality since the start of the test is measured in a case where the total number of test packets transmitted after the start of the test is counted. In a case where the number of test packets transmitted after the end of the previous measurement is counted, the packet loss caused between the end of the previous measurement and the current measurement is measured. Also, a packet loss rate can be calculated by dividing the value "n1−n2" obtained according to the equation (2) by the value n1. When the quality calculating procedure of step S224 is ended, the calculation results are recorded on the quality result holding unit 160. After the calculation by the quality measuring unit 158 is finished, the quality measuring unit 158 suspends the operation until the next quality measurement starting command 162 is issued from the measurement triggering unit 159.

In step S225, whether the measuring operation has been finished is determined. More specifically, if there is a measurement stopping command issued from the system, the quality measuring procedure is stopped (YES), and the series of procedures is ended (END). If there is not a measurement stopping command issued from the system ("NO" in step S225), the operation moves on to step S226.

In step S226, a part of the operation to be performed by the measurement triggering unit 159 is carried out. The value obtained by adding the observation interval Ta and the calculation time Tb at which the last quality measurement is started is set as the next quality measurement starting time. Accordingly, in step S226, the operation is suspended until the current time exceeds the next quality measurement starting time. When the time comes, the measurement triggering unit 159 transmits the quality measurement starting command 162 to the quality measuring unit 158. After this procedure of step S226, the operation moves on to step S223.

Of the above related arts of the present invention, the passive-type sampling measurement in the first communication system is carried out by performing a statistical calculation based on data obtained through sampling. In this manner, the quality of full-captured packets as the originally generated packets is estimated.

In the active-type quality measurement in the second communication system, test packets are transmitted to the network, and the characteristics such as the number of test packets received through the network and the variation of intervals are recorded. Those recorded characteristics are processed in a statistical manner, so as to estimate the quality in the network.

With the above related arts, however, there are the following problems that should be solved.

The first one of the problems with the above related arts is that the accuracy of the results of quality measurement carried out by the measuring devices is uncertain. More specifically, in the first and second communication systems, quality is measured based on statistical calculations. The quality estimated from measured values is statistically determined by the sampling amount of subjects. In the case of the first communication system, the sampling amount is the number "n" of obtained packets. In the second communication system, the sampling amount is equivalent to the packet loss amount (n1−n2). In the first and second communication systems, however, quality is measured at an observation interval that is set in advance. Therefore, there is the problem that the measurement accuracy cannot be clear until actual quality measurement is carried out.

The second problem with the above related arts is that the accuracy of the results of quality measurement carried out by the measuring devices varies every time. As described above, in the first and second communication systems, quality measurement is carried out based on statistical calculations. Although the quality estimated from measured values is statistically determined by the sampling amount of subjects, results are calculated at the measurement interval (a time interval) that is determined in advance. Therefore, the number of samples of the subject varies every time the observation interval time passes, and the accuracy of the results of quality measurement varies every time accordingly.

The third problem with the related arts is that it is difficult to compare the time-series elements of the same check item measured in a quality measuring operation with one another, and it is also difficult to compare the results of quality measurement of some flow with the results of other quality measurement. As described above, in the first and second communication systems, quality measurement is carried out based on statistical calculations. Furthermore, results are calculated at the predetermined measurement interval. Therefore, it is difficult to use the same criteria for evaluating objects having different numbers of samples on which measurement is based. For example, according to the central limit theorem by which the sample average of a population is determined by the normal distribution, regardless of the distribution of the population, it is statistically apparent that there is a relationship expressed by the equation (4) among the number of samples, the error rate expressed by the equation (3), and the confidence interval. Accordingly, even if a packet flow rate estimated from one sample and a packet flow rate estimated from 100 samples have the same expected values, the error rates and the confidence intervals obtained from the expected values are different from each other. Here, an "error rate" indicates what percentage is allowed as an error over and below the expected value, and a "confidence interval" indicates the probability that the real value falls in the error rate interval. For example, if there are the flow amount obtained in a case where the expected value is 100, the error rate is 50%, and the confidence interval is 70%, and the flow amount obtained in a case where the expected value is 90, the error rate is 10%, and the confidence interval is 90%, it is difficult to determine which is originally larger.

$$\text{(Error rate)} = ((\text{real value}) - (\text{sample number/sampling probability}))/(\text{real value}) \quad (3)$$

$$\text{(Error rate)} \leq (\text{confidence coefficient})/(\text{sample number}) \times \frac{1}{2} \quad (4)$$

Here, the confidence coefficient is a coefficient determined by the confidence interval.

Lastly, the fourth problem with the related arts is that the active-type measurement carried out in the second communication system for measuring quality by transmitting test packets through the network results in excessive load on the network. In the second communication system, the test packet transmission rate is fixed. Therefore, even if a statistically sufficient amount of data is obtained, communications are performed at a transmission rate higher than necessary, since the transmission rate is not varied.

Next, embodiments of the present invention are described.

To solve the above described problems with the related arts, quality measurement in accordance with the embodiments of the present invention is carried out by storing data observed through passive- or active-type measurement and statically or dynamically determining an observation interval at which data are obtained from the data storage and quality measurement is carried out, based on observation accuracy that is calculated in advance. In this measurement calculation, the observation time is determined so as to guarantee certain quality. In this manner, certain accuracy can be guaranteed in the results of the quality measurement. Also, it becomes easier to compare results obtained at one time with results obtained at another time, or compare a flow with another flow.

In a case where received data are packets, the information on which the quality calculation is based may be the number of packets contained in a certain set in the received data, the results of the past and current quality measurement, or information that is input from the outside.

The observation time may be calculated by any method, as long as certain quality can be guaranteed. For example, the observation interval may be calculated so as to obtain a sample number that can guarantee a predetermined confidential coefficient and a predetermined error rate. An example of the calculation method is expressed by the following equation (5):

$$\text{(Observation time)} > ((\text{confidential coefficient})/(\text{error rate}))2/(\text{sample number}) \quad (5)$$

Here, the sample number may be determined by constantly observing the number of samples stored in the portion where received data are stored, or may be determined by predicting the number of samples observed during the next unit time, based on the past quality information.

Here, the samples are used for achieving quality of the subject. If flow rate measurement is carried out, the number of packets is counted, and if packet loss measurement is carried out, the amount of packet loss is measured.

In a case where the number of test packets can be adjusted as in the case of the active-type measurement, the transmission rate as well as the observation time is adjusted, so as to maintain required accuracy. If the required observation time is long, the transmission rate is made higher so as to shorten the observation time and guarantee the accuracy. Also, it is possible to guarantee the required observation accuracy by varying transmission rate while fixing the observation time. Alternatively, a transmission rate that can achieve the required observation accuracy and an allowable observation time is calculated, and the transmission rate is adjusted accordingly, so as to reduce the number of test packets flowing in the network to a requisite minimum number.

The following is a detailed description of embodiments of the present invention, with reference to the accompanying drawings.

First Embodiment

FIG. 1 shows the structure of a communication system that can measure network quality in accordance with a first embodiment of the present invention. In this communication system, the quality of packet communications between a first communication terminal 301 and a second communication terminal 302 is measured. A first sampling and capturing device 306 is placed as a branching device on a communication link 305 connecting a data receiver 303 of the first communication terminal 301 and a data transmitting unit 304 of the second communication terminal 302. Also, a second sampling and capturing device 311 is placed as another branching device on a communication link 309 connecting a data transmitting unit 307 of the first communication terminal 301 and a data receiver 308 of the second communication terminal 302. Packets 312 and 313 that are obtained from the first and second sampling and capturing devices 306 and 311 and are subjected to measurement are input to the quality measuring device 314, which measures the quality of packet communications.

The quality measuring device 314 includes: a packet storing unit 322 that stores the packets 312 and 313 sampled and captured through the first and second sampling and capturing devices 306 and 311; a quality measuring unit 323 that analyzes the data stored in the packet storing unit 322, so as to measure the quality of the network and the quality of a flow or the like determined by a combination of the same transmission terminal or reception terminal and a protocol or the like; a measurement triggering unit 324 that notifies the quality measuring unit 323 of the timing of quality analysis; an observation time calculating unit 325 that calculates a measurement interval based on the past results obtained from the quality measuring unit 323, so as to determine the next observation time; a quality result holding unit 326 that stores the results of the quality measurement carried out by the quality measuring unit 323; and a quality display unit 328 that outputs the quality measurement results held by the quality result holding unit 326 as a result display signal 327 to a display (not shown) or the like. The packet storing unit 322 may not be provided in the quality measuring device 314. The quality measuring device 314 may be placed between the quality measuring device 314 except the packet storing unit 322 and the first and second sampling and capturing devices 306 and 311, or may be provided in each of the first and second sampling and capturing devices 306 and 311.

Figure 9:
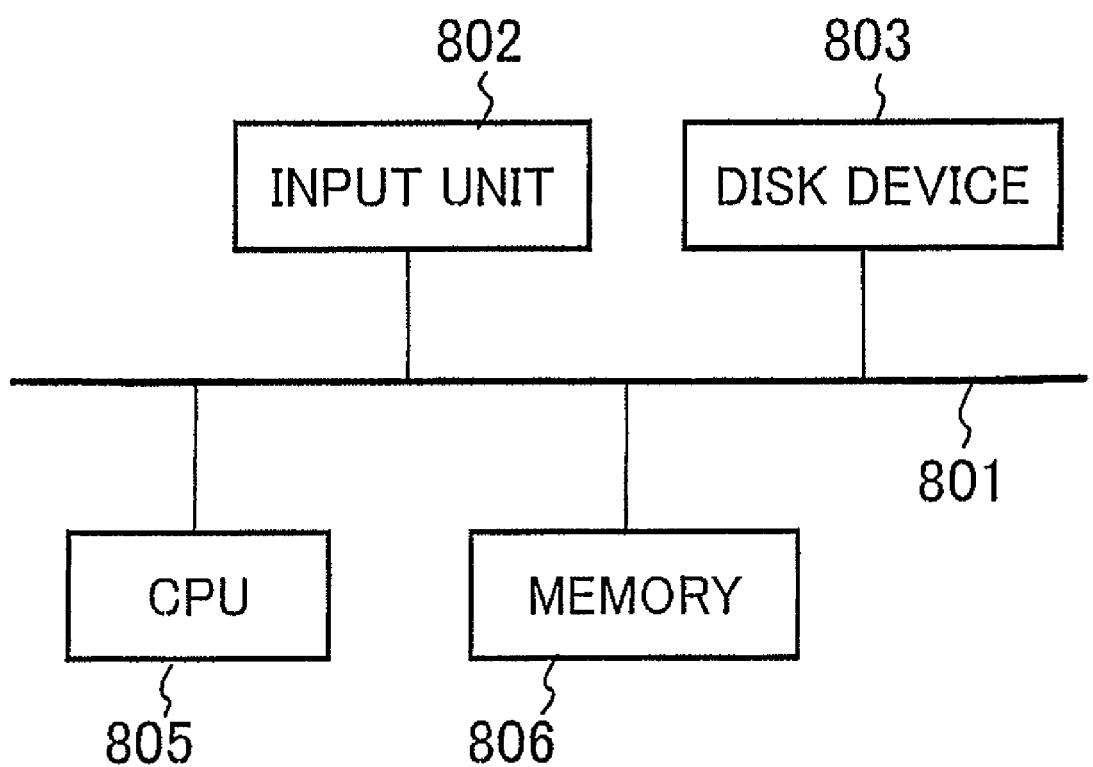
FIG. 9 illustrates an example structure of a computer.

The quality measuring device 314 of this embodiment includes a CPU (not shown) and a recording medium (not shown) that stores a predetermined control program (a quality measuring program). At least a part of each of the components constituting the device can be realized by software. More specifically, the control program is stored in a disk device 803 such as a hard disk in a computer as shown in FIG. 9, and the control program is executed by a CPU 805 carrying out the procedures shown in the flowchart in FIG. 2. The data necessary for executing the control program is stored in a memory 806 such as a RAM. The necessary data are input through an input unit 802 such as a keyboard. Accuracy information 329 for guaranteeing measurement accuracy is input through the input unit 802. Reference numeral 801 indicates a bus connecting the respective components. The accuracy information 329 for guaranteeing the measurement accuracy may be stored in the disk device 803.

The quality measuring device 314 captures the data flowing in the network connecting the first communication terminal 301 and the second communication terminal 302, and then starts the procedures for quality measurement. The data that is input through the first and second sampling and capturing devices 306 and 311 is stored together with the respective data acquirement times in the packet storing unit 322.

The observation time calculating unit 325 beforehand sets the accuracy information 329 for guaranteeing the measurement accuracy. In this embodiment, various conventional methods may be utilized, as long as the desired measurement accuracy can be guaranteed. For example, a sample number is set in advance, and the time required for the number of samples reaching the sample number is set as the measurement time, so as to guarantee certain accuracy. In this manner, the period of time in which the amount of data stored in the packet storing unit 322 (also serving as the data storing unit) increases by a predetermined amount is set as the time interval for securing the measurement time of the quality measuring unit.

In another example, an error rate and a confidence interval are set, and accuracy is determined so that the error rate and the confidence interval fall in a certain range. The observation time for maintaining the accuracy may be set as the time for guaranteeing certain accuracy. Based on the accuracy information that is set in advance, and the past quality information calculated by the quality measuring unit 323 or the number of certain packets stored in the packet storing unit 322, the observation time or the like for maintaining the set accuracy is calculated. Examples of the calculations include the following first to sixth calculation methods.

<First Calculation Method>

The first calculation method involves a regular calculation technique, protocols such as UDP (User Datagram Protocol), TCP (Transmission Control Protocol), and RTP (Real-time Transport Protocol), the amount of packet loss, the packet flow rate, and the likes.

The observation time in accordance with the first calculation method is expressed by the following equation (6):

(Observation time)>((confidential coefficient)/(error rate))2/(number of corresponding packets)    (6)

<Second Calculation Method>

The second calculation method is used for calculations with respect to TCP packet loss, and an observation time t is expressed by the following equation (7):

$$t \geq \frac{\left(\frac{d}{E}\right)^2 \cdot RTT}{1 - \sum_{j=0}^{k-1} \frac{\left(s\sqrt{\frac{8}{3bp}}\right)^j}{j!} e^{-\left(s\sqrt{\frac{8}{3bp}}\right)}} \sqrt{\frac{2b}{3p}} \qquad (7)$$

In the equation (7), "s" represents the sampling probability, "b" represents the TCP delay ACK (Transmission Control Protocol delay ACKnowledge) parameter, "p" represents the packet loss rate, "d" represents the confidential coefficient, "E" represents the error rate, and RTT represents the round trip times. If the RTT cannot be directly calculated, the RTT may be estimated from the throughput.

<Third Calculation Method>

The third calculation method is used for calculations with respect to TCP throughputs, and the observation interval is expressed by the following equation (8):

(Observation interval=(time at which an ACK number is received)−(time at which another ACK number is received)    (8)

<Fourth Calculation Method>

The fourth calculation method is used for calculations with respect to TCP throughputs, and the observation interval is expressed by the following equation (9):

(Observation interval)=(time at which a sequence number is received)−(time at which another sequence number is received)    (9)

Here, the third and fourth calculation methods are for determining observation intervals based on packet acquirement times. An accurate TCP throughput can be determined by setting the observation interval as the time equivalent to the difference between ACK numbers or sequence numbers and the interval between the two packets. However, the packet acquiring interval varies among communications. Therefore, in the first and second conventional suggestions that have the observation intervals determined in advance, this calculation method cannot be used. If this calculation method is used, errors are caused in the packet acquiring times and the differences between the fixed measurement intervals. By varying the measurement interval as in the present invention, a TCP throughput can be determined without an error.

In the above described manner, the observation time calculating unit 325 calculates the measurement interval, and notifies the measurement triggering unit 324 of the result. Based on the notified observation interval, the measurement triggering unit 324 calculates the next observation time. When the designated observation time comes, the measurement triggering unit 324 transmits a quality measurement starting command 331 to the quality measuring unit 323 to start quality measurement. Every time the quality measurement starting command 331 is transmitted from the measurement triggering unit 324, the quality measuring unit 323 starts a quality calculating procedure. In the quality calculating procedure, the quality measuring unit 323 carries out quality measurement based on the data obtained from the packet storing unit 322 after the previous measurement, and based on the data obtained after the start of the quality measurement if the quality calculating procedure is carried out immediately after the start of the measuring operation. The quality measurement is carried out with respect to the data amount. More specifically, the quality measurement is carried out with respect to the packet flow rate or packet loss, using the equation (1) as in the conventional case, the equation (10), or the equation (11), or utilizing a conventional quality measurement method concerning sampling.

<Fifth Calculation Method>

The fifth calculation method is used for calculations with respect to TCP throughputs, and the packet flow rate is expressed by the following equation (10):

$$\text{(Packet flow rate)} = \text{(ACK number of a flow)} - \text{(another ACK number of the flow)} \quad (10)$$

<Sixth Calculation Method>

The sixth calculation method is used for calculations with respect to TCP throughputs, and the packet flow rate is expressed by the following equation (11):

$$\text{(Packet flow rate)} = \text{(sequence number of a flow)} - \text{(another sequence number of the flow)} \quad (11)$$

When the quality calculating procedure by the quality measuring unit 323 utilizing one of the above first through sixth calculation methods comes to an end, the data as the calculation result is recorded on the quality result holding unit 326. After the quality calculating procedure, the quality measuring unit 323 suspends the operation, until the quality measurement starting command 331 is transmitted again from the measurement triggering unit 324.

In the timing designated by the system, the quality display unit 328 outputs the quality measurement results stored in the quality result holding unit 326 as a result display signal 327 to a device such as a display. The timing designated by the system may be a time interval that is fixed by the device in advance, or may be an event that occurs when the communication amount exceeds a predetermined value or becomes smaller than a predetermined value, for example.

Next, a quality measuring operation to be performed by the quality measuring device 314 of the communication system shown in FIG. 1 is described.

Figure 2:
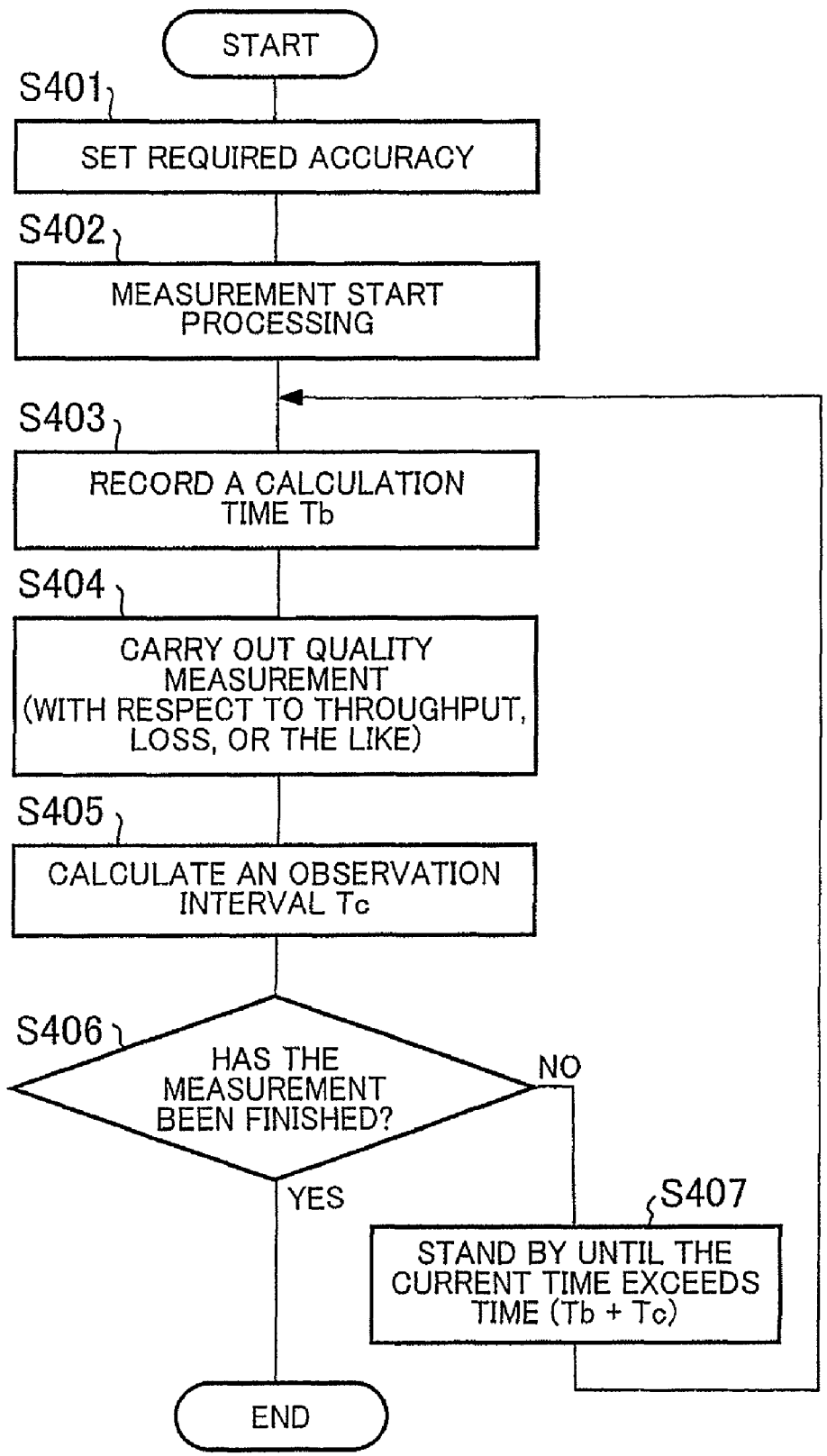
FIG. 2 is a flowchart showing a network quality measurement processing in the communication system in accordance with the first embodiment.

FIG. 2 shows an operation flow of the quality measuring operation to be performed on the network in the communication system in accordance with the first embodiment. In this communication system, the accuracy information 329 for guaranteeing measurement accuracy is input to the observation time calculating unit 325 of the quality measuring device 314 before the start of the measuring operation (step S401). It is possible to utilize any kind of method for guaranteeing measurement accuracy.

An example of the measurement accuracy may be represented by the time that is required for the number of samples acquired to exceed a predetermined sample number and guarantees certain accuracy. In another example, an error rate and a confidential interval are set as measurement accuracy, and the observation time required for maintaining the measurement accuracy may be set as the time that guarantees certain accuracy.

After the accuracy information 329 for guaranteeing measurement accuracy is input, a measurement start processing is carried out to start measurement (step S402). After the measurement starting procedure, the packets 312 and 313 as the data captured by the first and second sampling and capturing devices 306 and 311 are stored in the packet storing unit 322 in the quality measuring device 314.

In step S403, a part of the operation to be performed by the measurement triggering unit 324 is performed. Here, the time at which the quality measurement starting command 331 is transmitted from the measurement triggering unit 324 to the quality measuring unit 323 is recorded as the calculation time Tb. After the calculation time Tb is recorded, a quality measuring procedure is started.

In step S404, the quality measuring procedure is carried out by the quality measuring unit 323. In this procedure, quality measurement is carried out based on the data obtained from the packet storing unit 322 after the previous measurement. However, if the procedure is carried out immediately after the start of the operation, quality measurement is carried out based on the data received after the start of the quality measuring operation. The quality measurement carried out in this first embodiment involves the data amount or packet loss amount, for example. Accordingly, quality measurement is carried out with respect to the packet flow rate or packet loss, using the equation (1) used in the conventional case or the equation (10) or (11), or utilizing a conventional quality measurement method concerning sampling.

When the quality measuring procedure carried out by the quality measuring unit 323 ends, data as the calculation result is recorded on the quality result holding unit 326. After finishing the quality calculating procedure, the quality measuring unit 323 suspends the operation until the next quality measurement starting command 331 is transmitted from the measurement triggering unit 324.

The procedure of step S405 is carried out by the observation time calculating unit 325. Based on the past quality measurement results, the information supplied from the packet storing unit 322, and the accuracy information 329 for guaranteeing measurement accuracy that is input in advance, the observation time calculating unit 325 performs a calculation according to one of the equations (6) to (9), so as to determine an observation interval Tc required before the next quality calculation. The observation time calculating unit 325 then transmits the result to the measurement triggering unit 324.

In step S406, whether the measuring operation is to end is determined. If there is a measurement stopping command from the system, the quality measuring operation is stopped (YES), and is ended (END). If there is not a measurement stopping command from the system ("NO" in step S406), the operation moves on to step S407.

The procedure of step S407 is carried out as a part of the operation of the measurement triggering unit 324. The value obtained in this procedure by adding the calculation time Tb of the last quality measurement and the observation interval Tc calculated by the observation time calculating unit 325 is set as the next quality measurement starting time. The operation is suspended until the quality measurement starting time comes. When the time comes, the quality measurement starting command 331 is transmitted to the quality measuring unit 323. After the quality measurement starting command 331 is transmitted, the operation moves on to step S403.

In the first embodiment, the above described operation is performed by the quality measuring device 314. This is now compared with the conventional techniques illustrated in FIGS. 10 to 15. By the conventional techniques, the observation intervals are fixed. Therefore, there is a possibility that the number of samples based on which quality measurement is calculated varies between the observation times or flows. As a result, there are the problems that: (1) the accuracy of the results of quality measurement carried out by the measuring device is unclear; and (2) the accuracy of the results of quality measurement carried out by the measuring device varies every time. Further, there is the problem that (3) it is difficult to compare the same quality check items measured by the measuring device in chronological order, or to accurately compare the quality measurement results of a flow with the quality measurement results of another flow.

In the first embodiment of the present invention, on the other hand, the observation interval can be varied so as to achieve fixed accuracy in the results of quality measurement. Accordingly, certain accuracy of the results of quality measurement can be guaranteed according to some evaluation criteria. It is possible to utilize any kind of guaranteeing method. For example, accuracy may be guaranteed simply with a predetermined sample number, or accuracy may be guaranteed with a predetermined error rate and a predetermined confidence interval. In this embodiment, the accuracy of measurement results is guaranteed according to certain evaluation criteria, so that: (1) the accuracy of measurement results can be predicted in advance; (2) the accuracy of measurement results can be predicted before each measuring operation; and (3) it becomes easier to compare the same quality check items measured by the measuring device in chronological order, or to accurately compare the quality measurement results of a flow with the quality measurement results of another flow.

In the first embodiment, the first and second sampling and capturing devices 306 and 311 are placed between the lines connecting the first communication terminal 301 and the second communication terminal 302, but the present invention is not limited to that structure. More specifically, as long as the packets transmitted from the communication terminals can be captured through sampling, each of the first and second sampling and capturing devices 306 and 311 may be placed in a router or a switch, and packet sampling may be performed through the router or the switch. Also, it is possible not to place the first and second sampling and capturing devices 306 and 311 outside the network, and to sample and capture subject packets by terminals placed at the ends of communications transmitting and receiving packets (hereinafter referred to as ten END terminals).

Further, it is possible to utilize various methods for transmitting sampled packets to the quality measuring device. For example, it is possible to make copies of packets obtained through sampling, and send the copies. It is also possible to gather parts of packets captured through sampling into one packet, and input the packet to the quality measuring device via the network.

Although quality measurement is carried out to measure the quality of packets in the first embodiment, the present invention is not limited to that. For example, it is possible to apply the present invention to a quality measuring device that measures the quality of various kinds of data flowing in a network, such as frames or cells.

Although the quality measuring device that measures real-time line quality has been described in the first embodiment, the present invention is not limited to that. For example, the present invention may be applied to a device that measures the line quality, based on stored past data. Further, in the first embodiment, the observation time calculating unit 325 calculates an observation interval or an observation time, based on the results of the past quality calculations. However, it is also possible to calculate an observation time, based on the information stored in the packet storing unit 322 or information supplied from the outside of the system.

Second Embodiment

Figure 3:
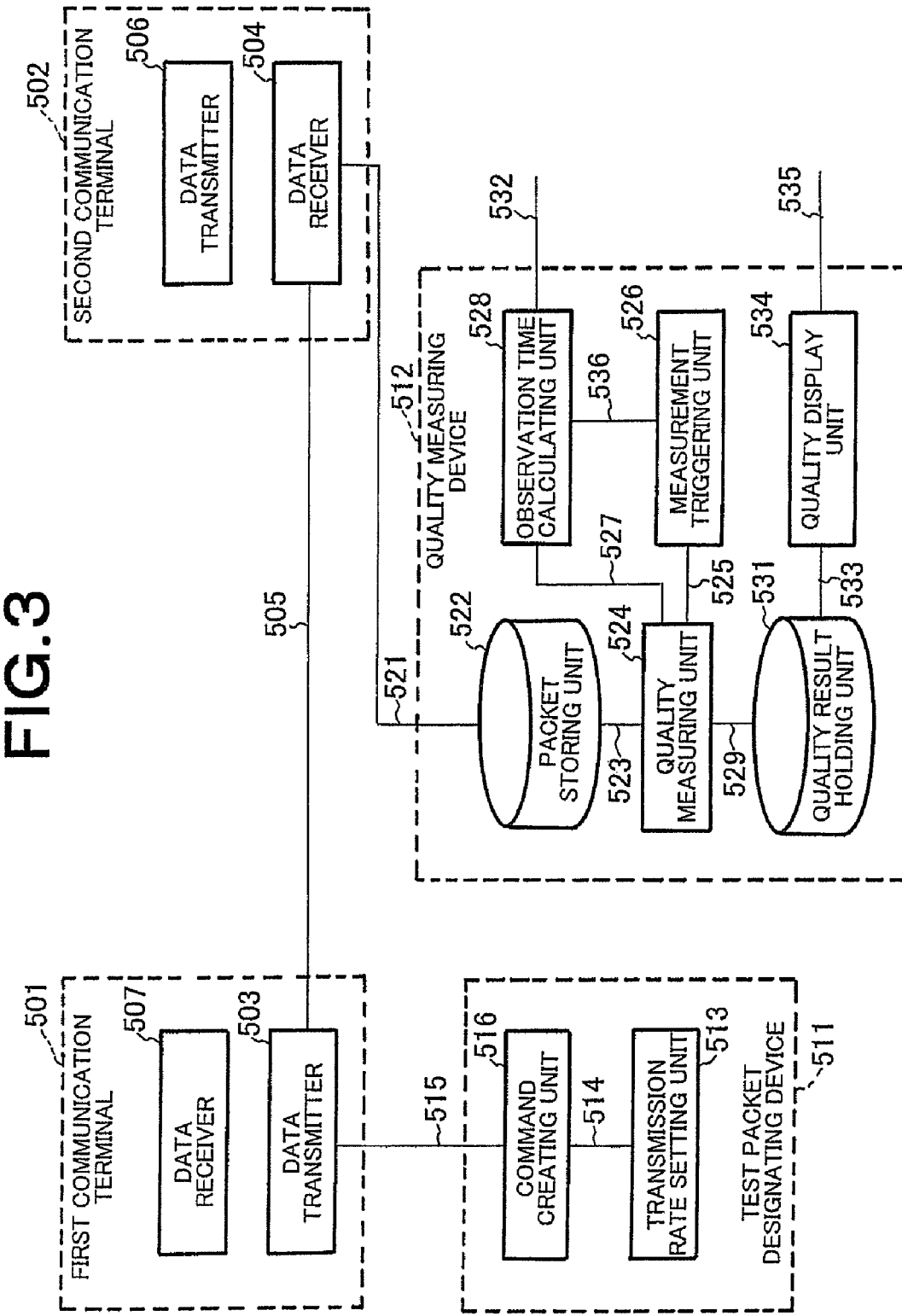
FIG. 3 shows the structure of a communication system in which network quality measurement is carried out in accordance with a second embodiment of the present invention.

FIG. 3 illustrates the structure of a communication system that can measure the quality of a network in accordance with a second embodiment of the present invention. In this communication system, the quality of packet communications between a first communication terminal 501 and a second communication terminal 502 is measured. For ease of explanation, the quality measurement to be carried out on packets transmitted from a data transmitting unit 506 of the second communication terminal 502 to a data receiver 507 of the first communication terminal 501 is not shown in the drawings, and explanation of it is omitted here, as quality measurement is to be carried out on test packets 505 transmitted from a data transmitting unit 503 of the first communication terminal 501 to a data receiver 504 of the second communication terminal 502 via a network (not shown). The data transmitting unit 503 can transmit packets other than the test packets 505, and the data receiver 504 can receive packets other than the test packets 505.

In this communication system, a test packet designating device 511 that sends an instruction to transmit the test packets 505 is connected to the first communication terminal 501, and a quality measuring device 512 that measures the quality of a data string as the test packets 505 is connected to the second communication terminal 502. The test packet designating device 511 includes a transmission rate setting unit 513 that determines a transmission rate, and a command creating unit 516 that transmits a command 515 to the first communication terminal 501 in accordance with an instruction 514 transmitted from the transmission rate setting unit 513.

The quality measuring device 512 of this embodiment has a CPU (not shown) and a recording medium (not shown) that stores a predetermined control program (a quality measuring program). At least a part of each of the components constituting the device can be realized by software, and the same applies to the test packet designating device 511. The control program is stored in the disk device 803 such as a hard disk in a computer as shown in FIG. 9, and the control program is executed by the CPU 805 carrying out the procedures shown in the flowchart in FIG. 4. The data necessary for executing the control program is stored in the memory 806 such as a RAM. The necessary data are input through the input unit 802 such as a keyboard. The accuracy information 329 for guaranteeing measurement accuracy is input through the input unit 802. Reference numeral 801 indicates a bus connecting the respective components. The accuracy information 329 for guaranteeing the measurement accuracy may be stored in the disk device 803. The disk device 803 may serve as a data storing unit 322. It is also possible to have one computer serving as the second communication terminal and the quality measuring device.

The quality measuring device 512 includes the packet storing unit 522 that inputs and stores packets 521 received by the data receiver 504 of the second communication terminal 502. Storage data 523 about the packets stored in the packet storing unit 522 is input to a quality measuring unit 524. The quality measuring unit 524 is connected to a measurement triggering unit (serving as a measurement start control unit) 526 that outputs a measurement starting command 525 to the quality measuring unit 524, an observation time calculating unit 528 that calculates an observation interval based on the results 527 of the past measurement carried out by the quality measuring unit 524 and determines the next observation time, and a quality result holding unit 531 that stores results 529 calculated by the quality measuring unit 524. Accuracy setting information 532 is input from the outside to the observation time calculating unit 528. The quality measurement results 533 held by the quality result holding unit 531 are transmitted to a quality display unit 534, and result information 535 is transmitted from the quality display unit 534 to an external device such as the test packet designating device 511 or the like so as to display the result information 535 on a display (not shown). The packet storing unit 522 may not be provided in the quality measuring device 512. The quality measuring device 512 may be provided in the second communication terminal 502. Alternatively, the quality measuring device 512 may be placed between the second communication terminal 502 and the quality measuring device 512 that does not include the data storing unit 522. The quality measuring device 512 and the second communication terminal 502 may be integrated into one device that has a communication function and a quality measuring function.

In the second embodiment, the test packet designating device 511 is designed to determine the transmission rate at which the test packets 505 as the data flow through the network (not shown) between the first communication terminal 501 and the second communication terminal 502, and to notify the command creating unit 516 of the transmission rate through the instruction 514. The command creating unit 516 outputs the command 515 to the data transmitting unit 503 of the first communication terminal 501, so as to transmit the test packets 505 at the transmission rate designated by the transmission rate setting unit 513. The data transmitting unit 503 of the first communication terminal 501 then transmits the test packets 505 at the designated transmission rate.

The data receiver 504 of the second communication terminal 502 receives the test packets 505 transmitted from the data transmitting unit 503 of the first communication terminal 501. The received packets 521 are stored in the packet storing unit 522 of the quality measuring device 512.

The observation time calculating unit 528 of the quality measuring device 512 beforehand sets the accuracy to be guaranteed as setting information 532. In this embodiment, various conventional methods may be utilized, as long as the accuracy can be guaranteed. For example, a sample number is set in advance, and the time required for the number of samples reaching the sample number is set as the observation time, so as to guarantee certain accuracy. In another example, an error rate and a confidence interval are set as desired accuracy, and the observation time for maintaining the accuracy may be set as the time for guaranteeing certain accuracy.

Based on the accuracy information that is input as the setting information 532, the past quality information calculated by the quality measuring unit 524, and the number of certain packets stored in the packet storing unit 522, the observation time calculating unit 528 calculates the observation interval for maintaining the set accuracy. The specific examples of the calculation have already been described, with reference to the equations (6) to (9). The observation interval calculated by the observation time calculating unit 528 is sent as an observation interval result 536 to the measurement triggering unit 526.

Based on the observation interval notified as the observation interval result 536, the measurement triggering unit 526 calculates the next observation time. After calculating the observation time, the measurement triggering unit 526 transmits the measurement starting command 525 to the quality measuring unit 524. Every time the measurement starting command 525 is transmitted from the measurement triggering unit 526, the quality measuring unit 524 starts a quality calculating procedure. In the quality calculating procedure, quality measurement is carried out based on the data obtained from the packet storing unit 522 after the previous measurement. If the quality calculating procedure is carried out immediately after the start of the operation, the quality measurement is carried out based on the data received after the start of the operation. The quality measurement is carried out with respect to the data amount. More specifically, the quality measurement is carried out with respect to the packet flow rate or packet loss, using the equation (1) as in one of the conventional cases, the equation (10), or the equation (11), or utilizing a conventional quality measurement method concerning sampling.

When the quality calculating procedure by the quality measuring unit 524 comes to an end, the data as a calculated result 529 is recorded on the quality result holding unit 531. After the quality calculating procedure, the quality measuring unit 524 suspends the operation, until the next measurement starting command 525 is transmitted from the measurement triggering unit 526.

In the timing designated by the system, the quality display unit 534 reads the quality measurement results 533 stored in the quality result holding unit 531, and outputs the result information 535 to a device (not shown) such as a display. The timing designated by the system may be a time interval that is fixed by the device in advance, or may be an event that occurs when the communication amount is equal to or exceeds a predetermined value, or is equal to or becomes smaller than a predetermined value, for example.

Figure 4:
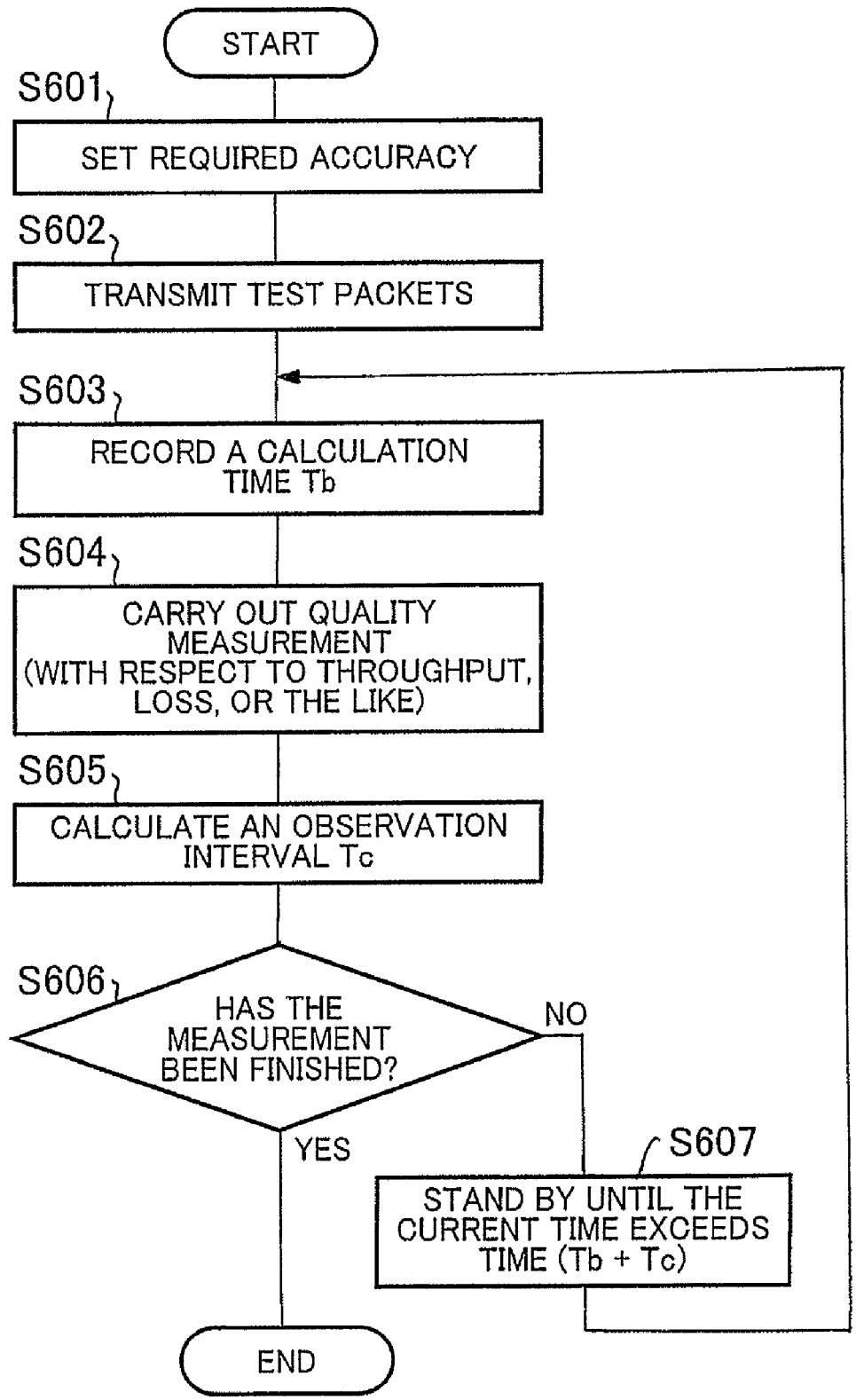
FIG. 4 is a flowchart showing a network quality measurement processing in the communication system in accordance with the second embodiment.

FIG. 4 shows an operation flow of a quality measuring operation to be performed on the network in the communication system in accordance with the second embodiment. Referring to FIGS. 3 and 4, the quality measuring operation is now described. In the communication system shown in FIG. 3, the information about the accuracy to be guaranteed is set as the setting information 532 in the observation time calculating unit 528 before the start of the measuring operation (step S601).

The procedure of step S602 is equivalent to the measurement starting procedure. The first communication terminal 501 starts transmitting the test packets 505 at a rate determined based on the transmission rate sent to the data transmitting unit 503 of the first communication terminal 501 in accordance with the command 515 from the command creating unit 516 in response to the instruction 514 from the transmission rate setting unit 513 in the test packet designating device 511 shown in FIG. 3. As the procedure of step S602 is carried out, the test packets 505 are sent to the second communication terminal 502, and the data receiver 504 stores the received packets 521 in the packet storing unit 522 of the quality measuring device 512.

In step S603, a part of the operation to be performed by the measurement triggering unit 526 is performed. Here, the time at which the measurement starting command 525 is transmitted from the measurement triggering unit 526 to the quality measuring unit 524 is recorded as the calculation time Tb. After the calculation time Tb is recorded, a quality measuring procedure by the quality measuring unit 524 is started (step S604).

In this quality measuring procedure of step S604, quality measurement is carried out based on the data obtained from the packet storing unit 522 after the previous measurement. However, if the procedure is carried out immediately after the start of the operation, quality measurement is carried out based on the data received after the start of the quality measuring operation. The quality measurement carried out in this second embodiment involves the data amount or packet loss amount, for example. Accordingly, quality measurement is carried out with respect to the packet flow rate or packet loss, using the equation (1) used in the conventional case or the equation (10) or (11), or utilizing a conventional quality measurement method concerning sampling. When the quality calculating procedure ends, the calculation result 529 is sent to and recorded on the quality result holding unit 531. After finishing the quality calculating procedure, the quality measuring unit 524 suspends the operation until the next measurement starting command 525 is transmitted from the measurement triggering unit 526, and the operation moves on to step S605.

The procedure of step S605 is carried out by the observation time calculating unit 528. Based on the past quality measurement results, the information supplied from the packet storing unit 522, and the guaranteed accuracy information that is input as the setting information 532 in advance, the observation time calculating unit 528 performs a calculation according to one of the equations (6) to (9), so as to determine an observation interval Tc required before the next quality calculation. The observation time calculating unit 528 then transmits the result as the observation interval result 536 to the measurement triggering unit 526, and the operation moves on to step S606.

In step S606, whether the measuring operation is to end is determined. If there is a measurement stopping command from the system, the quality measuring operation is stopped (YES), and the series of quality measuring procedures are ended (END). If there is not a measurement stopping command from the system ("NO" in step S606), the operation moves on to step S607.

The procedure of step S607 is carried out as a part of the operation of the measurement triggering unit 526. In step S607, a suspending procedure is carried out. More specifically, since the value obtained by adding the calculation time Tb of the start of the last quality measurement and the observation interval Tc represents the next quality measurement starting time, the operation is suspended until the current time exceeds the value. When the time has come, the measurement triggering unit 526 transmits the measurement starting command 525 to the quality measuring unit 524. The operation then moves on to step S603.

In the second embodiment, the above described operation is performed mainly by the quality measuring device 512. This is now compared with the conventional techniques. By the conventional techniques, the observation intervals are fixed. Therefore, there is a possibility that the number of samples based on which quality measurement is calculated varies between the observation times or flows. As a result, there are the problems that: (1) the accuracy of the results of quality measurement carried out by the measuring device is unclear; and (2) the accuracy of the results of quality measurement carried out by the measuring device varies every time. Further, there is the problem that (3) it is difficult to compare the same quality check items measured by the measuring device in chronological order, or to accurately compare the quality measurement results of a flow with the quality measurement results of another flow.

In the second embodiment of the present invention, on the other hand, the observation interval can be varied so as to achieve fixed accuracy in the results of quality measurement. Accordingly, certain accuracy of the results of quality measurement can be guaranteed according to some evaluation criteria. It is possible to utilize any kind of guaranteeing method. For example, accuracy may be guaranteed simply with a predetermined sample number, or accuracy may be guaranteed with a predetermined error rate and a predetermined confidence interval. In this embodiment, the accuracy of measurement results is guaranteed according to certain evaluation criteria, so that: (1) the accuracy of measurement results can be predicted in advance; and (2) the accuracy of measurement results can be predicted before each measuring operation. Further, (3) it becomes easier to compare the same quality check items measured by the measuring device in chronological order, or to accurately compare the quality measurement results of a flow with the quality measurement results of another flow.

In the communication system of the second embodiment, the first communication terminal 501 and the second communication terminal 502 are connected to each other via a network, and are placed between the test packet designating device 511 and the quality measuring device 512, as shown in FIG. 3. However, the present invention is not limited to that structure. The packets transmitted from the first communication terminal 501 to the second communication terminal 502 may be captured by a router or a switch through sampling.

Also, the packets to be observed at the end terminals, not within the network, may be captured through sampling. Further, it is possible to utilize various methods for transmitting sampled packets to the quality measuring device. For example, it is possible to make copies of packets obtained through sampling, and send the copies. It is also possible to gather parts of packets captured through sampling into one packet, and input the packet to the quality measuring device via the network.

Although quality measurement is carried out to measure the quality of packets in the second embodiment, the present invention is not limited to that. For example, it is possible to apply the present invention to a quality measuring device that measures the quality of various kinds of data flowing in a network, such as frames or cells.

Although the quality measuring device that measures real-time line quality has been described in the second embodiment, the present invention is not limited to that. For example, the present invention may be applied to a device that measures the line quality, based on stored past data. Further, in the second embodiment, the observation time calculating unit 528 calculates an observation interval or an observation time, based on the results of the past quality calculations. However, it is also possible to calculate an observation time, based on the information stored in the packet storing unit 522 or information supplied from the outside of the system.

Third Embodiment

Figure 5:
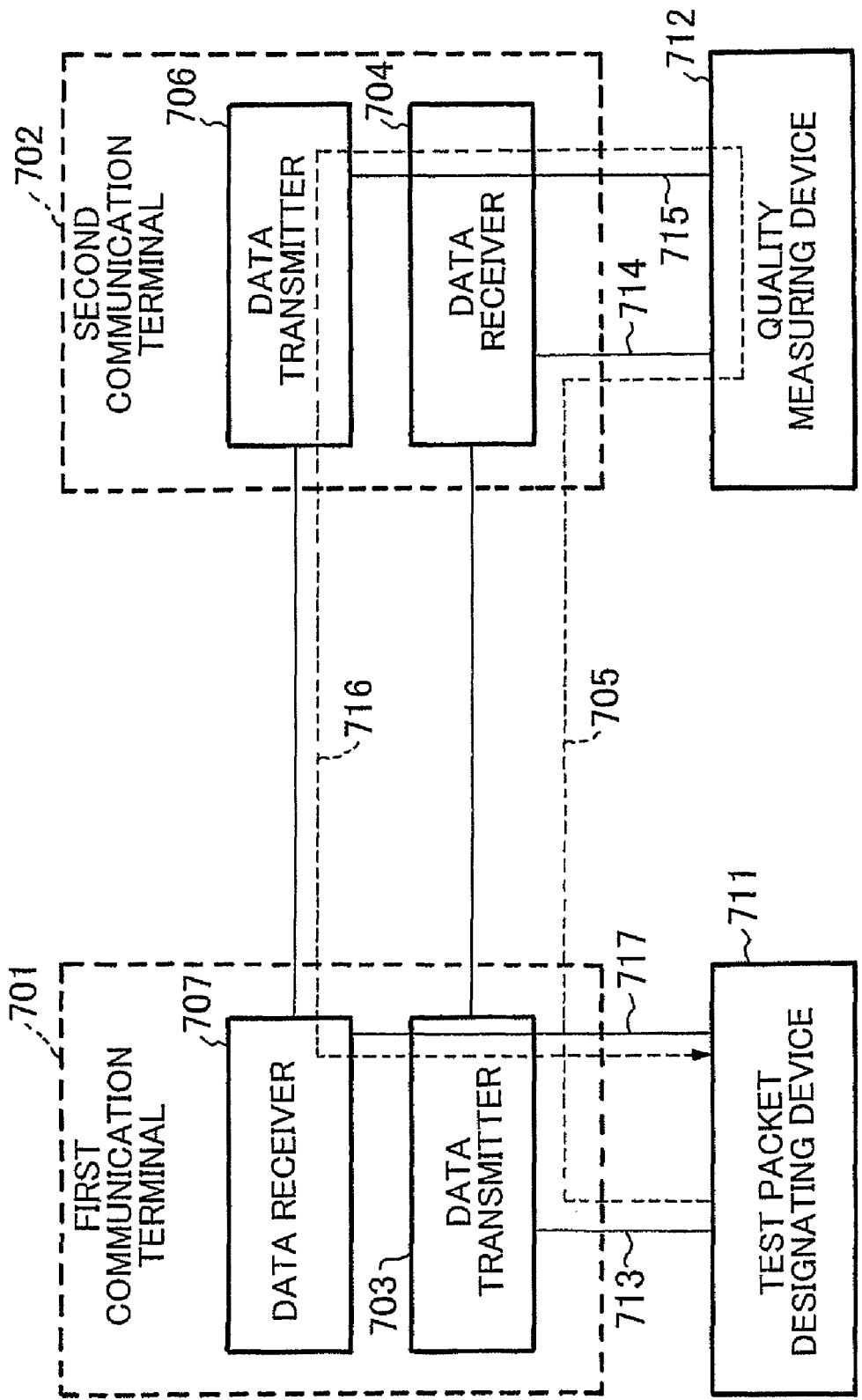
FIG. 5 shows the structure of a communication system in which network quality measurement is carried out in accordance with a third embodiment of the present invention.

FIG. 5 illustrates the structure of a communication system in which network quality measurement is carried out in accordance with a third embodiment of the present invention. In this communication system, the quality of packet communications between a first communication terminal 701 and a second communication terminal 702 is measured. For ease of explanation, the quality measurement to be carried out on packets transmitted from a data transmitting unit 706 of the second communication terminal 702 to a data receiver 707 of the first communication terminal 701 is not shown in the drawings, and explanation of it is omitted here, as quality measurement is to be carried out on test packets 705 transmitted from a data transmitting unit 703 of the first communication terminal 701 to a data receiver 704 of the second communication terminal 702. The data transmitting unit 703 can transmit packets other than the test packets 705, and the data receiver 704 can receive packets other than the test packets 705. The data transmitting unit 706 can also transmit packets other than quality result notifications 716, and the data receiver 707 can receive packets other than the quality result notifications 716.

In this communication system, a test packet designating device 711 that sends an instruction to transmit the test packets 705 is connected to the first communication terminal 701, and a quality measuring device 712 that measures the quality of a data string as the test packets 705 is connected to the second communication terminal 702. The test packet designating device 711 sends a measurement instruction 713 to the data transmitting unit 703 of the first communication terminal 701. In accordance with the measurement instruction 713, the data transmitting unit 703 transmits the test packets 705 to the data receiver 704 of the second communication terminal 702.

The quality measuring device 712 of this embodiment has a CPU (not shown) and a recording medium (not shown) that stores a predetermined control program (a quality measuring program). At least a part of each of the components constituting the device can be realized by software, and the same applies to the test packet designating device 711. The control program is stored in the disk device 803 such as a hard disk in a computer as shown in FIG. 9, and the control program is executed by the CPU 805 carrying out the procedures shown in the flowchart in FIG. 7. The data necessary for executing the control program is stored in the memory 806 such as a RAM. The necessary data are input through the input unit 802 such as a keyboard. The accuracy information 329 for guaranteeing measurement accuracy is input through the input unit 802. Reference numeral 801 indicates a bus connecting the respective components. The accuracy information 329 for guaranteeing the measurement accuracy may be stored in the disk device 803. The disk device 803 may serve as a packet storing unit 732. It is also possible to have one computer serving as the second communication terminal and the quality measuring device.

The quality measuring device 712 measures the quality of the test packets 705 based on a quality notification 714 from the data receiver 704 of the second communication terminal 702, and transmits the result 715 to the data transmitting unit 706 of the second communication terminal 702. The data transmitting unit 706 transmits it as the quality result notification 716 to the first communication terminal 701. The data receiver 707 of the first communication terminal 701 receives the quality result notification 716, and transmits it as quality result information 717 to the test packet designating device 711. In this manner, the test packet designating device 711 can receive a quality result notification about the test packets 705. As will be described later, the quality measuring device 712 also transmits information about the transmission rate for the test packets 705 to the packet designating device 711.

Figure 6:
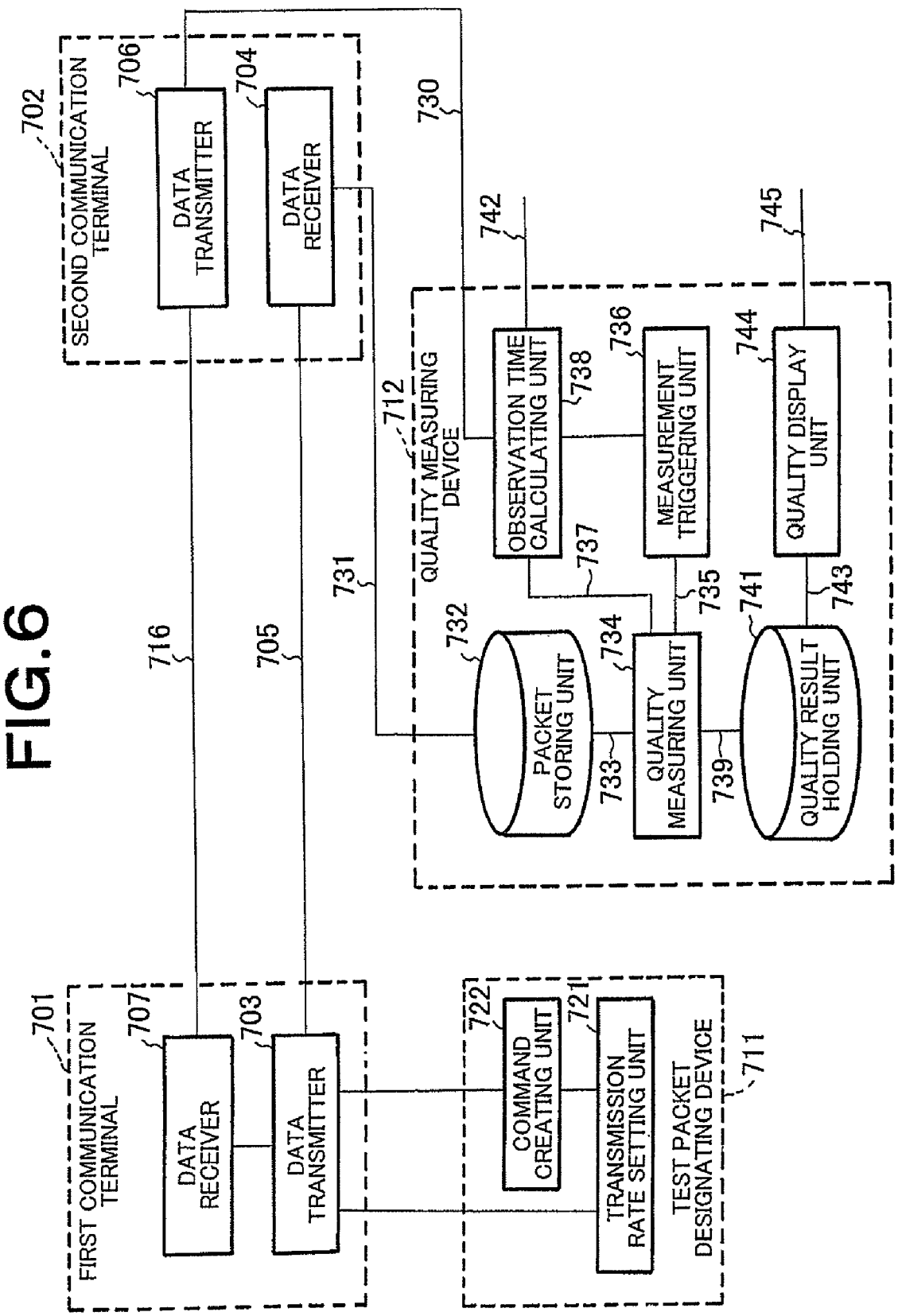
FIG. 6 illustrates the structures of the test packet designating device and the quality measuring device in accordance with the third embodiment.

FIG. 6 illustrates the test packet designating device and the quality measuring device in accordance with the third embodiment. The test packet designating device 711 includes a transmission rate setting unit 721 that determines a transmission rate based on information from the quality measuring device 712 as will be described later, and a command creating unit 722 that transmits the transmission rate to the first communication terminal 701.

The quality measuring device 712 includes the packet storing unit 732 that inputs and stores packets 731 received by the data receiver 704 of the second communication terminal 702. Storage data 733 about the packets stored in the packet storing unit 732 is input to a quality measuring unit 734. The quality measuring unit 734 is connected to a measurement triggering unit (serving as a measurement start control unit) 736, an observation time calculating unit 738, and a quality result holding unit 741. The measurement triggering unit 736 outputs a measurement starting command 735 to the quality measuring unit 734. Based on the past results 737 of the quality measuring unit 734, the observation time calculating unit 738 calculates an observation interval, and determines the next observation time. The observation time calculating unit 738 also sends transmission rate information 730 to the data transmitting unit 706 of the second communication terminal 702, so as to transmit the information about the transmission rate for the test packets 705 to the transmission rate setting unit 721 of the test packets designating device 711. As will be described later, the transmission rate is determined in accordance with the equation (12). The quality result holding unit 741 stores results 739 calculated by the quality measuring unit 734. Among the results 739, setting information 742 about the accuracy and the measurement interval is input from the outside to the observation time calculating unit 738. The quality result holding unit 741 transmits the quality measurement result 743 held therein to a quality display unit 744. The quality display unit 744 transmits result information 745 to the test packet designating device 711, and the result information 745 is displayed on a display (not shown). It is of course possible to transmit the result information 745 to a device other than the test packet designating device 711, and display the result information 745 on the device. The packet storing unit 732 may not be provided in the quality measuring device 712. The quality measuring device 732 may be provided in the second communication terminal 702. Alternatively, the quality measuring device 732 may be placed between the second communication terminal 702 and the quality measuring device 712 that does not have the packet storing unit 732. The quality measuring device 712 and the second communication terminal 702 may be integrated into one device that has a communication function and a quality measuring function.

The transmission rate setting unit 721 of the test packet designating device 711 sends the transmission rate information 730 about the transmission rate determined by the observation time calculating unit 738 in the quality measuring device 712 to the data transmitting unit 706 of the second communication terminal 702. A packet into which the transmission rate information 730 transmitted from the data transmitting unit 706 is incorporated is transmitted from the second communication terminal 702 and is received by the data receiver 707 of the first communication terminal 701 via a network (not shown) connected to the second communication terminal 702. The transmission rate to be used in the data transmitting unit 703 is then determined. In this manner, the information about the transmission rate is sent to the transmission rate setting unit 721, and the command creating unit 722 instructs the data transmitting unit 703 of the first communication terminal 701 to transmit test packets at the transmission rate designated by the transmission rate setting unit 721. The data transmitting unit 703 then transmits the test packets 705 at the designated transmission rate.

The data receiver 704 of the second communication terminal 702 receives the test packets 705 transmitted from the data transmitting unit 703 of the first communication terminal 701. The received packets 721 are stored in the packet storing unit 732 of the quality measuring device 712.

The observation time calculating unit 738 beforehand sets the accuracy to be guaranteed as setting information 742. In this embodiment, various conventional methods may be utilized, as long as the measurement accuracy can be guaranteed. For example, a sample number is set in advance, and the time required for the number of samples reaching the sample number is set as the observation time, so as to guarantee certain accuracy. In another example, an error rate and a confidence interval are set as desired accuracy, and the observation time for maintaining the accuracy may be set as the time for guaranteeing certain accuracy. Based on the accuracy information that is set in advance, the past quality information calculated by the quality measuring unit 734, and the number of certain packets stored in the packet storing unit 732, the observation interval for maintaining the set accuracy is calculated. Specific examples of the calculation may involve the equations (6) to (9).

The observation time calculating unit 738 calculates the observation interval for setting the observation time, and sends the result to the measurement triggering unit 736. In general, the relationship expressed by the following equation (12) is established among a sample number, an observation time, and a transmission rate. Accordingly, the observation time calculating unit 738 may utilize an observation time calculation method by which such an observation time as to observe the predetermined number of samples is estimated to maintain the required accuracy by performing a calculation according to the equation (12) based on the current transmission rate and the number of samples obtained per unit time (based on the predetermined communication amount, the packet loss amount, the jitter, and the likes). Furthermore, to guarantee accuracy, not only the observation interval is varied, but also the transmission rate is varied and determined in the third embodiment. Accordingly, after the sample number for maintaining desired accuracy is calculated, an observation time and a transmission rate are determined based on the equation (12). The determined observation time is sent to the measurement triggering unit 736, and the transmission rate is sent to the transmission rate setting unit 721 of the test packet designating device 711 via the second communication terminal 702, the network, and the first communication terminal 701 in this order.

$$(\text{Observation time}) \times (\text{transmission rate}) = (\text{variable } \alpha) \times (\text{sample number}) \quad (12)$$

The right term of the equation (12) represents the observation accuracy to be guaranteed. If the value of the right term is the same, the accuracy is the same. For example, the same accuracy is obtained in a case where the observation time is one second and the transmission rate is 5 Mbps, and in a case where the observation time is 5 seconds and the transmission rate is 1 Mbps. Accordingly, if the transmission rate is fixed, the observation time is adjusted so that the right term becomes equal to or larger than a certain value. If the observation time is fixed, the transmission rate is adjusted so that the right term becomes equal to or larger than a certain value. It is of course possible to use both the transmission rate and the observation time as setting parameters.

In the case of active-type measurement, extra packets for test are flowing in the network, and therefore, the transmission rate should preferably be low in general. However, if a small value is set, the observation time for achieving the same observation accuracy becomes longer. For example, an extreme value such as "one day" is meaningless, being too long. There are indications (upper limits) of the required particle size and measurement result, though those values vary among network applications to be tested. In view of this, the observation time and the transmission rate are determined so as to satisfy the right term of the equation (12).

Based on the observation interval notification from the observation time calculating unit 738, the measurement triggering unit 736 calculates the next observation time. When the designated observation time comes, the measurement triggering unit 736 transmits the measurement starting command 735 to the quality measuring unit 734. Every time the measurement starting command 735 is transmitted from the measurement triggering unit 736, the quality measuring unit 734 starts a quality calculation. In the quality calculating procedure, quality measurement is carried out based on the data obtained from the packet storing unit 732 after the previous measurement. If the quality calculating procedure is carried out immediately after the start of the operation, the quality measurement is carried out based on the data received after the start of the operation. The quality measurement is carried out with respect to the data amount. More specifically, the quality measurement is carried out with respect to the packet flow rate or packet loss, using the equation (1) as in one of the conventional cases, the equation (10), or the equation (11), or utilizing a conventional quality measurement method concerning sampling. When the quality calculating procedure comes to an end, the calculated result 739 is sent to and recorded on the quality result holding unit 741. After the quality calculating procedure, the quality measuring unit 734 suspends the operation, until the next measurement starting command 735 is transmitted from the measurement triggering unit 736.

In the timing designated by the system, the quality display unit 744 receives the quality measurement results 743 stored in the quality result holding unit 741, and outputs the result information 745. This result information 745 is transmitted to the test packet designating device 711, and is displayed on a display (not shown). The timing designated by the system may be a time interval that is fixed by the device in advance, or may be an event that occurs when the communication amount is equal to or exceeds a predetermined value, or is equal to or becomes smaller than a predetermined value, for example.

Figure 7:
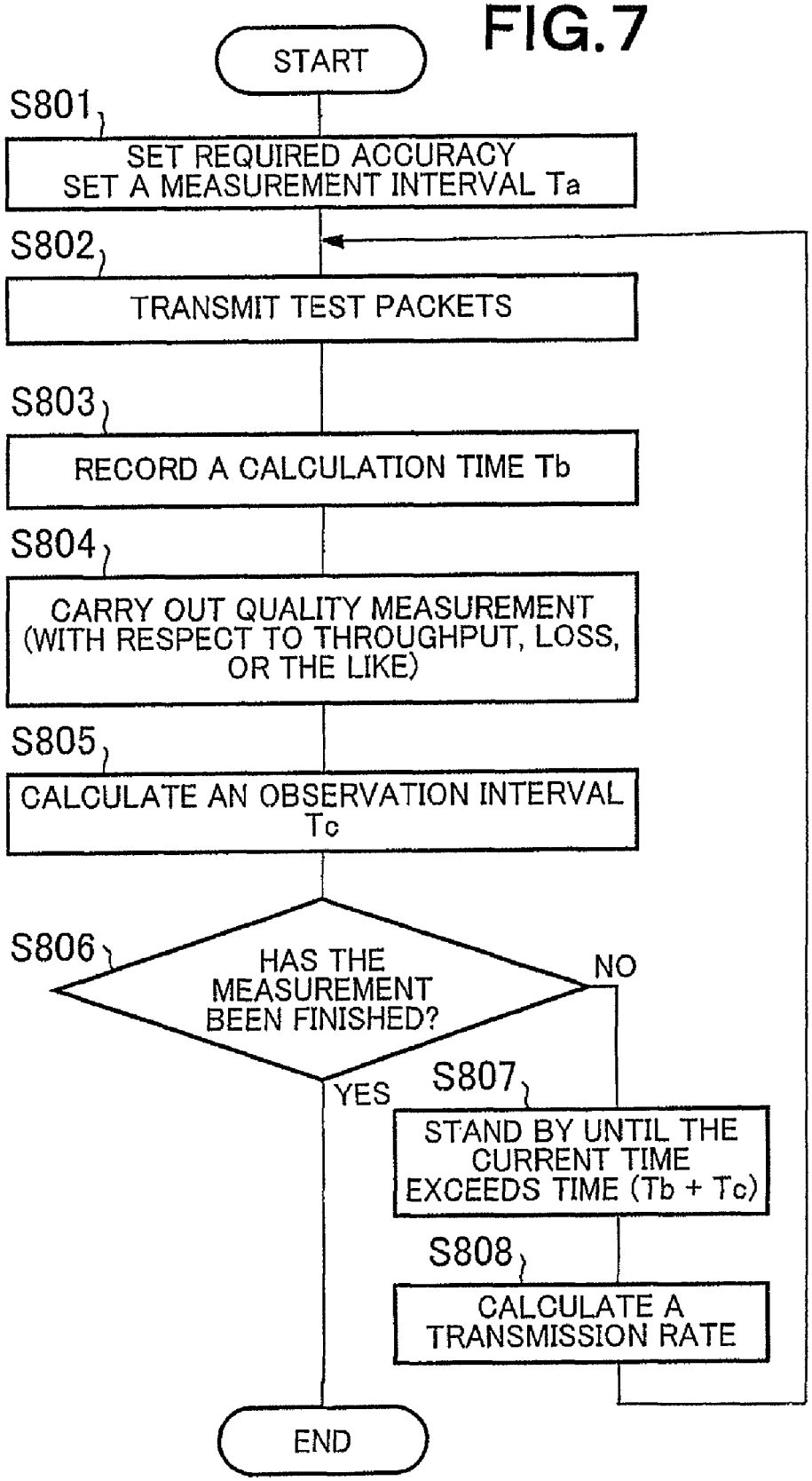
FIG. 7 is a flowchart showing a network quality measurement processing in the communication system in accordance with the third embodiment.

FIG. 7 shows an operation flow of a quality measuring operation to be performed on the network in the communication system in accordance with the third embodiment. Referring to FIGS. 6 and 7, the quality measuring operation is now described. In the communication system shown in FIG. 6, the setting information 742 indicating the accuracy to be guaranteed and a measurement interval Ta is set in the observation time calculating unit 738 before the start of the measuring operation (step S801).

The procedure of step S802 is equivalent to the measurement starting procedure. Transmission of the test packets 705 from the data transmitting unit 706 of the second communication terminal 702 is started at the designated rate. As this procedure is carried out, the test packets 705 are sent to the second communication terminal 702, and the data receiver 704 stores the packets in the packet storing unit 732 of the quality measuring device 712. After the procedure of step S802 is carried out, the operation moves on to step S803.

In step S803, a part of the operation to be performed by the measurement triggering unit 736 is performed. Here, the time at which the measurement starting command 735 is transmitted from the measurement triggering unit 736 to the quality measuring unit 734 is recorded as the calculation time Tb. After the calculation time Tb is recorded, a quality measuring procedure of step S804 is started.

This quality measuring procedure of step S804 is performed by the quality measuring unit 734. In this operation, quality measurement is carried out based on the data obtained from the packet storing unit 732 after the previous measurement. However, if the procedure is carried out immediately after the start of the operation, quality measurement is carried out based on the data received after the start of the quality measuring operation.

The quality measurement carried out in this third embodiment involves the data amount or packet loss amount, for example. Accordingly, quality measurement is carried out with respect to the packet flow rate or packet loss, using the equation (1) used in the conventional case or the equation (10) or (11), or utilizing a conventional quality measurement method concerning sampling. When the quality calculating procedure ends, the calculation result 739 is sent to and recorded on the quality result holding unit 741. After finishing the quality calculating procedure, the quality measuring unit 734 suspends the operation until the next measurement starting command 735 is transmitted from the measurement triggering unit 736.

The procedure of step S805 is carried out by the observation time calculating unit 738. Based on the past quality measurement results, the information supplied from the packet storing unit 732, and the guaranteed accuracy information that is input as the setting information 742 in advance, the observation time calculating unit 738 performs a calculation according to one of the equations (6) to (9), so as to determine an observation interval Tc that is required before the next quality calculation at the current transmission rate. Further, in accordance with the relationship expressed by the equation (12), the observation time calculating unit 738 determines a new observation interval Tc and a new transmission rate. If the observation time is too long, the transmission rate is made higher, so that certain accuracy can be guaranteed even when the observation time is short. The observation interval Tc determined here is transmitted to the measurement triggering unit 736. The transmission rate information 730 is transmitted to the transmission rate setting unit 721 of the test packet designating device 711 via the second communication terminal 702, the network, and the first communication terminal 701.

In step S806, whether the measuring operation is to end is determined. If there is a measurement stopping command from the system (YES), the quality measuring operation is stopped and is ended. If there is not a measurement stopping command from the system ("NO" in step S806), the operation moves on to step S807.

The procedure of step S807 is carried out as a part of the operation of the measurement triggering unit 736. The value obtained by adding the calculation time Tb of the start of the last quality measurement and the observation interval Tc represents the next quality measurement starting time. Accordingly the operation is suspended until the current time exceeds the value. When the suspension time has passed, the measurement triggering unit 736 transmits the measurement starting command 735 to the quality measuring unit 734.

In step S808, the transmission rate determined by the observation time calculating unit 738 is transmitted to the transmission rate setting unit 721 via the second communication terminal 702, the network, and the first communication terminal 701. The new transmission rate is then determined. After this procedure, the operation moves on to step S802.

In the third embodiment, the above described procedures are carried out by the test packet designating device 711 and the quality measuring device 712. This quality measuring operation in accordance with the third embodiment is now compared with the conventional techniques. By the conventional techniques, the observation intervals are fixed. Therefore, there is a possibility that the number of samples based on which quality measurement is calculated varies between the observation times or flows. As a result, there are the problems that: (1) the accuracy of the results of quality measurement carried out by the measuring device is unclear; and (2) the accuracy of the results of quality measurement carried out by the measuring device varies every time. Further, there is the problem that (3) it is difficult to compare the same quality check items measured by the measuring device in chronological order, or to accurately compare the quality measurement results of a flow with the quality measurement results of another flow.

In the third embodiment of the present invention, on the other hand, the observation interval can be varied so as to achieve fixed accuracy in the results of quality measurement. Accordingly, certain accuracy of the results of quality measurement can be guaranteed according to some evaluation criteria. It is possible to utilize any kind of guaranteeing method. For example, accuracy may be guaranteed simply with a predetermined sample number, or accuracy may be guaranteed with a predetermined error rate and a predetermined confidence interval. In this embodiment, the accuracy of measurement results is guaranteed according to certain evaluation criteria, so that: (1) the accuracy of measurement results can be predicted in advance; and (2) the accuracy of measurement results can be predicted before each measuring operation. Further, (3) it becomes easier to compare the same quality check items measured by the measuring device in chronological order, or to accurately compare the quality measurement results of a flow with the quality measurement results of another flow.

In this third embodiment, the adjustment for guaranteeing observation accuracy is performed with the use of both the observation time and the transmission rate. If the required observation time is long, the observation time can be shortened by increasing the transmission rate, so as to guarantee accuracy. Also, the necessary observation accuracy can be guaranteed by fixing the observation time while varying the transmission rate. Further, the necessary observation accuracy and the transmission rate that can be achieved within the allowable observation time are calculated, and the transmission rate is adjusted, so as to minimize the amount of test packets to be transmitted through the network.

In the communication system of the third embodiment, the first communication terminal 701 and the second communication terminal 702 are connected to each other via a network, and are placed between the test packet designating device 711 and the quality measuring device 712, as shown in FIG. 5. However, the present invention is not limited to that structure. The packets transmitted from the first communication terminal 701 to the second communication terminal 702 may be captured by a router or a switch through sampling, as long as observation is performed in a place where the packets can be captured through sampling.

Also, the packets to be observed at the end terminals, not within the network, may be captured through sampling. Further, it is possible to utilize various methods for transmitting sampled packets to the quality measuring device. For example, it is possible to make copies of packets obtained through sampling, and send the copies. It is also possible to gather parts of packets captured through sampling into one packet, and input the packet to the quality measuring device via the network.

Although quality measurement is carried out to measure the quality of packets in the third embodiment, the present invention is not limited to that. For example, it is possible to apply the present invention to a quality measuring device that measures the quality of various kinds of data flowing in a network, such as frames or cells.

Although the quality measuring device that measures real-time line quality has been described in the third embodiment, the present invention is not limited to that. For example, the present invention may be applied to a device that measures the line quality, based on stored past data. Further, in the third embodiment, the observation time calculating unit 738 calculates an observation interval or an observation time, based on the results of the past quality calculations. However, it is also possible to calculate an observation time, based on the information stored in the packet storing unit 732 or information supplied from the outside of the system.

As described above, in accordance with this embodiment, the time required until the sample amount that guarantees the predetermined accuracy, and the test packet transmission rate are calculated. With the time interval and the test packet transmission rate being made variable, quality measurement is carried out. Thus, the accuracy of measurement results can be predicted in advance.

Also, in accordance with this embodiment, the observation interval and the test packet transmission rate are made variable so as to guarantee certain accuracy. Accordingly, the accuracy of measurement results can be predicted in every observation interval.

Further, in accordance with this embodiment, the observation interval and the test packet transmission rate can be varied, so that the sample amounts and accuracies to be compared with one another are maintained at the same level. Accordingly, it becomes easier to compare the same measured quality check items in chronological order, and to accurately compare the quality measurement results of a flow with the quality measurement results of another flow.

Also, in accordance with this embodiment, the sample number required for guaranteeing accuracy can be adjusted with the observation interval and the test packet transmission rate. Accordingly, in a case where there is a limit to the observation interval and it is not possible to arbitrarily set the observation interval, accuracy can be guaranteed in measurement results by adjusting the transmission rate. Also, in a case where there is a limit to the test packet transmission rate and it is not possible to arbitrarily set the test packet transmission rate, accuracy can be guaranteed in measurement results by adjusting the observation interval. Furthermore, the number of test packets to be transmitted through the network can be minimized by adjusting the test packet transmission rate to a minimum value within the range in which the necessary observation accuracy can be maintained in an allowable observation time. In this manner, quality measurement can be carried out, without putting extra load on the network.

Fourth Embodiment

Figure 8:
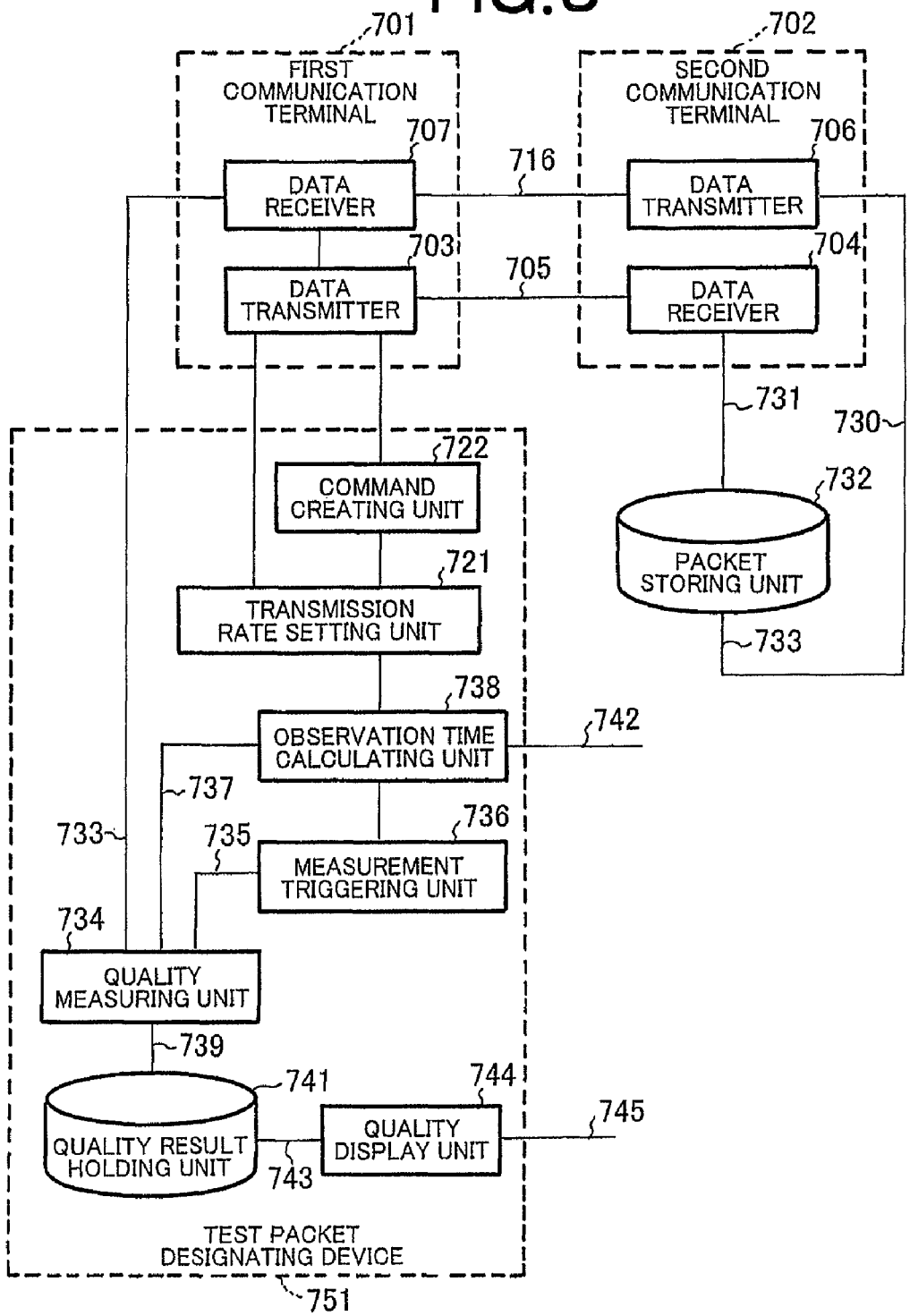
FIG. 8 illustrates the structure of a communication system that is capable of carrying out network quality measurement in accordance with a fourth embodiment of the present invention.

FIG. 8 illustrates the structure of a communication system in which network quality measurement is carried out in accordance with a fourth embodiment of the present invention. In this communication system, the components of the quality measuring device minus the packet storing unit 732 of the communication system of the third embodiment shown in FIG. 6 are provided in a test packet designating device 751, as shown in FIG. 8. The test packet designating device 751 differs from the test packet designating device 711 shown in FIG. 6, in including the quality measuring unit 734, the measurement triggering unit (serving as the measurement start control unit) 736, the observation time calculating unit 738, the quality result holding unit 741, and the quality display unit 744, as well as the transmission rate setting unit 721 and the command creating unit 722. The respective components in the test packet designating device 751 function in the same manner as the respective components of the test packet designating device 711 and the quality measuring device 712 described in the third embodiment.

In this embodiment, the packets 731 received by the data receiver 704 of the second communication terminal 702 are stored in the packet storing unit 732, and the stored data 733 about the stored packets is input to the quality measuring unit 734 via the data transmitting unit 706 of the second communication terminal 702 and the data receiver 707 of the first communication terminal 701. The quality measuring unit 734 is connected to the measurement triggering unit 736, the observation time calculating unit 738, and the quality result holding unit 741. The measurement triggering unit 736 outputs the measurement starting command 735 to the quality measuring unit 734. Based on the past results 737 of the quality measuring unit 734, the observation time calculating unit 738 calculates an observation interval, so as to determine the next observation time. The observation time calculating unit 738 then transmits the information about the transmission rate for the test packets 705 to the transmission rate setting unit 721 of the test packet designating device 711.

The test packet designating device 751 and the first communication terminal 701 may be integrated into a device that has a communication function, a test packet instructing function, and a quality measuring function. Here, the test packet designating device 751 is formed by integrating the quality measuring device 712 (minus the packet storing unit 732) with the test packet designating device 711 shown in FIG. 6. However, the quality measuring device 712 (minus the packet storing unit 732) shown in FIG. 6 may be provided as a device independent of the test packet designating device 711 shown in FIG. 6.

The test packet designating device 751 of this embodiment has a CPU (not shown) and a recording medium (not shown) that stores a predetermined control program. At least a part of each of the components constituting the device can be realized by software. The control program is stored in the disk device 803 such as a hard disk in a computer as shown in FIG. 9, and the control program is executed by the CPU 805. The data necessary for executing the control program is stored in the memory 806 such as a RAM. The necessary data are input through the input unit 802 such as a keyboard. The accuracy information 742 for guaranteeing measurement accuracy is input through the input unit 802. Reference numeral 801 indicates a bus connecting the respective components. The accuracy information 742 for guaranteeing the measurement accuracy may be stored in the disk device 803. It is also possible to have one computer serving as the first communication terminal and the test packet designating device.

The effects to be achieved with the structure in accordance with the fourth embodiment are the same as the effects achieved with the structure in accordance with the third embodiment.

As described in the first to fourth embodiments, the quality measuring device including the quality measuring unit 734, the measurement triggering unit 736, the observation time calculating unit 738, the quality result holding unit 741, and the quality display unit 744 may be placed between the first communication terminal and the second communication terminal via a branching device. Alternatively, the quality measuring device may be placed on the side of the second communication terminal, or on the side of the first communication terminal. If necessary, the packet storing unit may be placed in the quality measuring device.

Although the quality measuring device and the test packet designating device are formed with computers in each of the first to fourth embodiments, it is possible to form a quality measuring device and a test packet designating device with ICs, such as special-purpose ICs, FAGA (Field Programmable Gate Arrays), or the like, or with a component or components of the above described quality measuring device and the above described test packet designating device. In other words, any of the structures in accordance with the present invention can be realized with either software or hardware. Although the data are to be transmitted for test to the transmission path in each of the second to fourth embodiments, the data are not limited to test data.

Various other variations may be made without departing from the spirit or the features of the present invention. Each of the above described embodiments is merely an example, and the present invention is not limited to the embodiments. The present invention is claimed in the claims, and is not restricted by the specification and abstract. Further, modifications and changes may be made to the embodiments within the scope of the claimed invention.

The invention claimed is:

1. A communication system comprising:
a transmission path through which data are transmitted;
a capturing device that causes the data flowing through the transmission path to be captured in midstream; and
a quality measuring device that is connected to the capturing device,
the quality measuring device comprising:
a quality measuring unit that measures communication quality of the transmission path, based on the captured data;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is a time required for maintaining predetermined measurement accuracy in the communication quality measured by the quality measuring unit.

2. A communication system comprising:
a transmission path through which data are transmitted;
first and second communication terminals that are connected by the transmission path;
a transmission rate setting unit that is connected to the first communication terminal, and sets a transmission rate for the data being transmitted through the transmission path; and
a quality measuring device that is connected to the second communication terminal,
the quality measuring device comprising:
a quality measuring unit that measures communication quality of the transmission path, based on data received by the second communication terminal;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is a time required for maintaining predetermined measurement accuracy in the communication quality measured by the quality measuring unit.

3. The communication system according to claim 2, wherein:
the observation time calculating unit calculates the time interval for securing the observation time for the quality measuring unit and a transmission rate so as to maintain the measurement accuracy, and transmits information about the transmission rate to the transmission rate setting unit; and
the transmission rate setting unit sets the transmission rate for the data being transmitted through the transmission path, based on the information about the transmission rate.

4. A communication system comprising:
a transmission path through which data are transmitted;
first and second communication terminals that are connected by the transmission path;
a transmission rate setting unit that is connected to the first communication terminal, and sets a transmission rate for the data being transmitted through the transmission path;
a quality measuring device that is connected to the transmission rate setting unit; and
a data storing unit that is connected to the second communication terminal,
the quality measuring device comprising:
a quality measuring unit that measures communication quality of the transmission path, based on data transmitted from the data storing unit and received by the first communication terminal;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is a time required for maintaining predetermined measurement accuracy in the communication quality measured by the quality measuring unit,
the observation time calculating unit calculates the time interval for securing the observation time for the quality measuring unit and a transmission rate so as to maintain the measurement accuracy, and transmits information about the transmission rate to the transmission rate setting unit, and
the transmission rate setting unit sets the transmission rate for the data being transmitted through the transmission path, based on the information about the transmission rate.

5. A test packet designating device comprising:
a transmission rate setting processor that sets a transmission rate for a test packet to be transmitted through a transmission path;
a quality measuring processor that measures communication quality of the transmission path, based on the test packet transmitted through the transmission path;

an observation time calculating processor that calculates a time interval for securing an observation time for the quality measuring processor; and a measurement start control processor that causes the quality measuring processor to start measurement at the time interval calculated by the observation time calculating processor, wherein the observation time is a time required for maintaining predetermined measurement accuracy in the communication quality measured by the quality measuring processor, the observation time calculating processor calculates the time interval for securing the observation time for the quality measuring processor and a transmission rate of the test packet so as to maintain the measurement accuracy, and transmits information about the transmission rate to the transmission rate setting processor, and the transmission rate setting processor sets the transmission rate for the test packet being transmitted through the transmission path, based on the information about the transmission rate.

6. A quality measurement method to be utilized in a communication system that includes: a transmission path through which data are transmitted; first and second communication terminals that are connected by the transmission path; a transmission rate setting unit that is connected to the first communication terminal and sets a transmission rate for the data being transmitted through the transmission path; and a quality measuring device that is connected to the second communication terminal and includes a quality measuring unit that measures communication quality of the transmission path, based on data received by the second communication terminal, wherein the quality measuring device performs:
  calculating a time interval for securing an observation time required for maintaining predetermined measurement accuracy in the communication quality measured by the quality measuring unit; and
  causing the quality measuring unit to start measurement at the calculated time interval; and wherein: the quality measuring device performs:
  calculating the time interval for securing the observation time for the quality measuring unit and a transmission rate so as to maintain the measurement accuracy;
  transmitting information about the transmission rate to the transmission rate setting unit; and
  causing the transmission rate setting unit to set a transmission rate for the data being transmitted through the transmission path, based on the information about the transmission rate.

7. A quality measurement method to be utilized in a communication system that includes:
  a transmission path through which data are transmitted; first and second communication terminals that are connected by the transmission path;
  a transmission rate setting unit that is connected to the first communication terminal and sets a transmission rate for the data being transmitted through the transmission path;
  a data storing unit that is connected to the second communication terminal; and
  a quality measuring device that is connected to the transmission rate setting unit and includes a quality measuring unit that measures communication quality of the transmission path, based on data transmitted from the data storing unit and received by the first communication terminal, the quality measurement method comprising:
  calculating a time interval for securing an observation time required for maintaining predetermined measurement accuracy in the communication quality measured by the quality measuring unit;
  causing the quality measuring unit to start measurement at the calculated time interval,
  calculating the time interval for securing the observation time and a transmission rate so as to maintain the measurement accuracy;
  transmitting information about the transmission rate to the transmission rate setting unit; and
  causing the transmission rate setting unit to set a transmission rate for the data being transmitted through the transmission path, based on the information about the transmission rate.

8. A quality measurement method to be utilized in a test packet designating device that includes: a transmission rate setting unit that sets a transmission rate for a test packet to be transmitted through a transmission path; and a quality measuring unit that measures communication quality of the transmission path, based on the test packet being transmitted through the transmission path, the quality measurement method comprising:
  calculating a time interval for securing an observation time required for maintaining predetermined measurement accuracy in the communication quality measured by the quality measuring unit;
  causing the quality measuring unit to start measurement at the calculated time interval,
  calculating the time interval for securing the observation time for the quality measuring unit and a transmission rate so as to maintain the measurement accuracy;
  transmitting information about the transmission rate to the transmission rate setting unit; and
  causing the transmission rate setting unit to set a transmission rate for the data being transmitted through the transmission path, based on the information about the transmission rate.

9. A non-transitory computer-readable medium comprising thereon a quality measuring program that is executed by a computer serving as a test packet designating device that sets a transmission rate for a test packet to be transmitted through a transmission path, the quality measuring program causing the computer to perform:
  a transmission rate setting function of setting the transmission rate for the test packet being transmitted through the transmission path;
  a quality measuring function of measuring communication quality of the transmission path, based on the test packet being transmitted through the transmission path;
  an observation time calculating function of calculating a time interval for securing an observation time required for maintaining predetermined measurement accuracy in the communication quality measured by the quality measuring function; and
  a measurement start control function of causing the quality measuring function to start measurement at the time interval calculated by the observation time calculating function, wherein the observation time calculating function calculates a time interval for securing the observation time for the quality measuring function and a transmission rate of the test packet so as to maintain the measurement accuracy, and transmits information about the transmission rate to the transmission rate setting function, and the transmission rate setting function sets a transmission rate for the test packet being transmitted through the transmission path, based on the information about the transmission rate.

10. A communication system comprising:
a transmission path through which data are transmitted;
first and second communication terminals that are connected by the transmission path;
a transmission rate setting unit that is connected to the first communication terminal, and sets a transmission rate for the data being transmitted through the transmission path; and
a quality measuring device that is connected to the second communication terminal,
the quality measuring device comprising:
a quality measuring unit that measures communication quality of the transmission path, based on data received by the second communication terminal;
an observation time calculating unit that calculates a time interval for securing an observation time for the quality measuring unit; and
a measurement start control unit that causes the quality measuring unit to start measurement at the time interval calculated by the observation time calculating unit,
wherein the observation time is a time required for maintaining predetermined measurement accuracy in the communication quality measured by the quality measuring unit,
the observation time calculating unit fixes the time interval for securing the observation time for the quality measuring unit, calculates a transmission rate so as to maintain the measurement accuracy, and transmits information about the transmission rate to the transmission rate setting unit, and
the transmission rate setting unit sets the transmission rate for the data being transmitted through the transmission path, based on the information about the transmission rate.

11. A quality measurement method to be utilized in a communication system that includes:
a transmission path through which data are transmitted;
first and second communication terminals that are connected by the transmission path;
a transmission rate setting unit that is connected to the first communication terminal and sets a transmission rate for the data being transmitted through the transmission path; and
a quality measuring device that is connected to the second communication terminal and includes a quality measuring unit that measures communication quality of the transmission path, based on data received by the second communication terminal,
the quality measurement method causing the quality measuring device to perform:
fixing the time interval for securing the observation time for the quality measuring unit, and calculating a transmission rate so as to maintain predetermined measurement accuracy in the communication quality measured by the quality measuring unit,
transmitting information about the transmission rate to the transmission rate setting unit, and
causing the transmission rate setting unit to set a transmission rate for the data being transmitted through the transmission path, based on the information about the transmission rate.

12. The communication system according to claim 1, further comprising a data storing unit that stores data transmitted from the transmission path,
wherein the observation time calculating unit determines the time interval to be a time in which the integrated amount of data stored in the data storing unit increases by a predetermined amount.

13. The communication system according to claim 1, wherein the observation time calculating unit extracts the data being transmitted through the transmission path under predetermined conditions, estimates a time in which the number of the extracted data reaches a predetermined sample number, and sets the estimated time as the time interval.

14. The communication system according to claim 1, wherein the communication quality is quality with respect to at least one of a communication amount, a data loss amount, a data loss rate, a delay time, a delay variation, and a delay distribution.

15. The communication system according to claim 1, wherein, with the measurement accuracy, an error rate of measurement results and a confidential interval as a probability that a real value falls in an interval having the error rate are within a predetermined range.

16. The communication system according to claim 1, wherein, with the measurement accuracy, the number of samples subjected to quality measurement becomes equal to or larger than a certain number.

17. The communication system according to claim 2, further comprising a data storing unit that stores data transmitted from the transmission part,
wherein the observation time calculating unit determines the time interval to be a time in which the integrated amount of data stored in the data storing unit increases by a predetermined amount.

18. The communication system according to claim 2, wherein the observation time calculating unit extracts the data being transmitted through the transmission path under predetermined conditions, estimates a time in which the number of the extracted data reaches a predetermined sample number, and sets the estimated time as the time interval.

19. The communication system according to claim 2, wherein the communication quality is quality with respect to at least one of a communication amount, a data loss amount, a data loss rate, a delay time, a delay variation, and a delay distribution.

20. The communication system according to claim 2, wherein, with the measurement accuracy, an error rate of measurement results and a confidential interval as a probability that a real value falls in an interval having the error rate are within a predetermined range.

21. The communication system according to claim 2, wherein, with the measurement accuracy, the number of samples subjected to quality measurement becomes equal to or larger than a certain number.

22. The communication system according to claim 3, further comprising a data storing unit that stores data transmitted from the transmission part,
wherein the observation time calculating unit determines the time interval to be a time in which the integrated amount of data stored in the data storing unit increases by a predetermined amount.

23. The communication system according to claim 3, wherein the observation time calculating unit extracts the data being transmitted through the transmission path under predetermined conditions, estimates a time in which the number of the extracted data reaches a predetermined sample number, and sets the estimated time as the time interval.

24. The communication system according to claim 3, wherein the communication quality is quality with respect to at least one of a communication amount, a data loss amount, a data loss rate, a delay time, a delay variation, and a delay distribution.

25. The communication system according to claim 3, wherein, with the measurement accuracy, an error rate of measurement results and a confidential interval as a probability that a real value falls in an interval having the error rate are within a predetermined range.

26. The communication system according to claim 3, wherein, with the measurement accuracy, the number of samples subjected to quality measurement becomes equal to or larger than a certain number.

27. The communication system according to claim 4, further comprising a data storing unit that stores data transmitted from the transmission path,
wherein the observation time calculating unit determines the time interval to be a time in which the integrated amount of data stored in the data storing unit increases by a predetermined amount.

28. The communication system according to claim 4, wherein the observation time calculating unit extracts the data being transmitted through the transmission path under predetermined conditions, estimates a time in which the number of the extracted data reaches a predetermined sample number, and sets the estimated time as the time interval.

29. The communication system according to claim 4, wherein the communication quality is quality with respect to at least one of a communication amount, a data loss amount, a data loss rate, a delay time, a delay variation, and a delay distribution.

30. The communication system according to claim 4, wherein, with the measurement accuracy, an error rate of measurement results and a confidential interval as a probability that a real value falls in an interval having the error rate are within a predetermined range.

31. The communication system according to claim 4, wherein, with the measurement accuracy, the number of samples subject to quality measurement becomes equal to or larger than a certain number.

* * * * *